US005630093A

United States Patent [19]
Holzhammer et al.

[11] Patent Number: 5,630,093
[45] Date of Patent: May 13, 1997

[54] DISK EMULATION FOR A NON-VOLATILE SEMICONDUCTOR MEMORY UTILIZING A MAPPING TABLE

[75] Inventors: Gerald S. Holzhammer, Aloha, Oreg.; Kurt B. Robinson, Newcastle, Calif.

[73] Assignee: Intel Corporation, Santa Clara, Calif.

[21] Appl. No.: 635,030

[22] Filed: Apr. 19, 1996

Related U.S. Application Data

[63] Continuation of Ser. No. 293,413, Aug. 23, 1994, abandoned, which is a continuation of Ser. No. 635,988, Dec. 31, 1990, abandoned.

[51] Int. Cl.[6] .................................................. G06F 12/00
[52] U.S. Cl. .............................................. 395/442; 395/412
[58] Field of Search ........................ 395/182.05, 182.06, 395/442, 412, 421.11, 600, 430

[56] References Cited

U.S. PATENT DOCUMENTS

| | | | |
|---|---|---|---|
| 4,279,024 | 7/1981 | Schrenk | 365/185.22 |
| 4,430,727 | 2/1984 | Moore et al. | 395/442 |
| 4,456,971 | 6/1984 | Fukuda et al. | 395/500 |
| 4,511,964 | 4/1985 | Georg et al. | 395/412 |
| 4,642,759 | 2/1987 | Foster | 395/500 |
| 4,644,494 | 2/1987 | Muller | 395/479 |
| 4,718,041 | 1/1988 | Baglee et al. | 365/185.22 |
| 4,755,939 | 7/1988 | Watson | 395/600 |
| 4,757,533 | 7/1988 | Allen et al. | 380/25 |
| 4,775,932 | 10/1988 | Oxley et al. | 395/622 |
| 4,797,810 | 1/1989 | McEntee et al. | 395/600 |

(List continued on next page.)

FOREIGN PATENT DOCUMENTS

| | | |
|---|---|---|
| 2088442 | 1/1993 | Canada . |
| 0175458A2 | 3/1986 | European Pat. Off. . |
| 0392895A2 | 10/1990 | European Pat. Off. . |
| 58-215794 | 12/1983 | Japan . |
| 58-215795 | 12/1983 | Japan . |
| 59-162695 | 9/1984 | Japan . |
| 62-283496 | 12/1987 | Japan . |
| 62-283497 | 12/1987 | Japan . |
| 63-183700 | 7/1988 | Japan . |

OTHER PUBLICATIONS

Michael Bloom, "A Memory to Remember," ESD: The Electronic System Design Magazine, vol. 19, No. 10, Oct. 1989, pp. 38–42.

Jonathan Matzkin, "Tiny, Powerful Poqet PC Tips the Scales at 1 lb.," PC Magazine, vol. 8, No. 19, Nov. 14, 1989, pp. 33–35, p. 35 missing.

Alfred Rosenblatt, "Make Room For Pocket Computers," Electronics, vol. 62, No. 11, Nov. 1989, pp. 93–96.

Ron Wilson, "1–Mbit Flash Memories Seek Their Role in System Design," Computer Design, vol. 28, No. 5, Mar. 1, 1989, pp. 30–31.

Bernard C. Cole, "Seeq Pushes Flash Memory to 1 Megabit," Electronics, vol. 62, No. 3, Mar. 1989, p. 85.

Bernard C. Cole, "How the U.S. is Leading the Way in Strategic Nonvolatile Technology," Electronics, vol. 62, No. 3, Mar. 1989, pp. 80–83.

Carl Olsen, "Letters From the Road: Around The World With A LapTop," PC Computing, vol. 2, No. 7, Jul. 1989, pp. 108–122.

(List continued on next page.)

*Primary Examiner*—Jack A. Lane
*Assistant Examiner*—Kevin Verbrugge
*Attorney, Agent, or Firm*—Blakely, Sokoloff, Taylor & Zafman

[57] ABSTRACT

A non-volatile semiconductor memory that is erased in blocks is described. The non-volatile semiconductor memory includes an active block for storing first data and a reserve block for storing second data. The second data is a copy of the first data. The copy is made during a clean-up operation prior to erasure of the active block. The non-volatile semiconductor memory also includes a mapping table for mapping a logical address of an allocation unit to a physical address of a sector within the non-volatile semiconductor memory.

26 Claims, 7 Drawing Sheets

U.S. PATENT DOCUMENTS

| | | | |
|---|---|---|---|
| 4,800,520 | 1/1989 | Iijima | 395/622 |
| 4,802,117 | 1/1989 | Chrosny et al. | 395/182.03 |
| 4,896,262 | 1/1990 | Wayama et al. | 395/500 |
| 4,958,315 | 9/1990 | Balch | 395/500 |
| 4,984,149 | 1/1991 | Iwashita et al. | 395/404 |
| 5,012,425 | 4/1991 | Brown | 364/464.02 |
| 5,047,989 | 9/1991 | Canepa et al. | 365/238.5 |
| 5,053,990 | 10/1991 | Kreifels et al. | 395/430 |
| 5,070,474 | 12/1991 | Tuma et al. | 395/500 |
| 5,077,737 | 12/1991 | Leger et al. | 395/182.04 |
| 5,101,490 | 3/1992 | Getson, Jr. et al. | 395/835 |
| 5,111,385 | 5/1992 | Hattori | 395/484 |
| 5,131,089 | 7/1992 | Cole | 395/500 |
| 5,163,021 | 11/1992 | Mehrotra et al. | 365/185.03 |
| 5,193,184 | 3/1993 | Belsan et al. | 395/404 |
| 5,200,959 | 4/1993 | Gross et al. | 371/21.6 |
| 5,210,866 | 5/1993 | Milligan et al. | 395/182.04 |
| 5,226,168 | 7/1993 | Kobayashi et al. | 395/800 |
| 5,268,870 | 12/1993 | Harari | 365/185.09 |
| 5,270,979 | 12/1993 | Harari et al. | 365/185.09 |
| 5,301,288 | 4/1994 | Newman et al. | 395/412 |
| 5,321,834 | 6/1994 | Weiser et al. | 395/600 |
| 5,392,427 | 2/1995 | Barrett et al. | 395/600 |
| 5,398,142 | 3/1995 | Davy | 360/48 |
| 5,404,485 | 4/1995 | Ban | 395/412 |

OTHER PUBLICATIONS

Michael C. Markowitz, "Nonvolatile Memories," EDN, vol. 34, No. 18, Sep. 1, 1989, pp. 94–104.

Daley et al., "Lightweight Laptops Make Hefty Boasts," Computerworld, Sep. 18, 1989, pp. 1 & 8.

French Patent Office Preliminary Search Report, dated Oct. 19, 1995, for French Counterpart Patent Application No. 91–16233.

K. Robinson, "Trends in Flash Memory System Design," Wescon Conference, Record 34, Nov. 1990, pp. 468–472.

D.A. Patterson, J.L. Hennessy, and D. Goldberg, *Computer Architecture a Quantitative Approach*, Morgan Kaufmann Publishers, Inc., p. 519 (1990).

R.D. Pashley and S.K. Lai, *Flash Memories: The Best of Two Worlds*, IEEE Spectrum, pp. 30–33 (Dec. 1989).

M.A. Levy and D. Elbert, *Solutions for High Density Applications Using Intel Flash Memory* (Oct. 1990), *1991 Memory Products Handbook*, Intel Corporation, pp. 6–297 through 6–344 (1990).

S. Zales, *Flash Memory Outshines ROM and EPROM*, EETimes (May 1990), *1991 Memory Products Handbook*, Intel Corporation, pp. 6–411 through 6–416 (1990).

R. Pashley, Nonvolatility: *Semiconductor vs. Magnetic*, IEEE, International Solid–State Circuits Conference (Feb. 17, 1988), *1991 Memory Products Handbook*, Intel Corporation, pp. 6–393 and 6–394 (1990).

M. Levy, *Flash Memory Operates 10–20 Times Longer*, Computer Technology Review (Aug. 1990), *1991 Memory Products Handbook*, Intel Corporation, pp. 6–417 and 6–418 (1990).

D. Lammers, *PC Standard in the Cards*, EETimes (May 1990), *1991 Memory Products Handbook*, Intel Corporation, pp. 6–407 through 6–410.

*Memory Breakthrough Drives Minaturization*, Portable Computing (Oct. 1990) *1991 Memory Products Handbook*, Intel Corporation, pp. 6–419 and 6–420 (1990).

S. Baker, *Silicon Bits, The Memory Driver, 1991 Memory Products Handbook*, Intel Corporation, p. 6–399 (1990).

D. Verner, *Designing an Updatable BIOS Using Flash Memory, 1991 Memory Handbook*, Intel Corporation, pp. 6–248 through 6–296 (Oct. 1990).

Data Sheets for the iMC001FLKA and the iMC004FLKA, *1991 Memory Products Handbook*, Intel Corporation, pp. 6–143 through 6–202 (Oct. 1990).

C. Townsend, *Advanced MS–DOS Expert Techniques for Programmers* pp. 1–63 (Howard W. Sams & Company 1989).

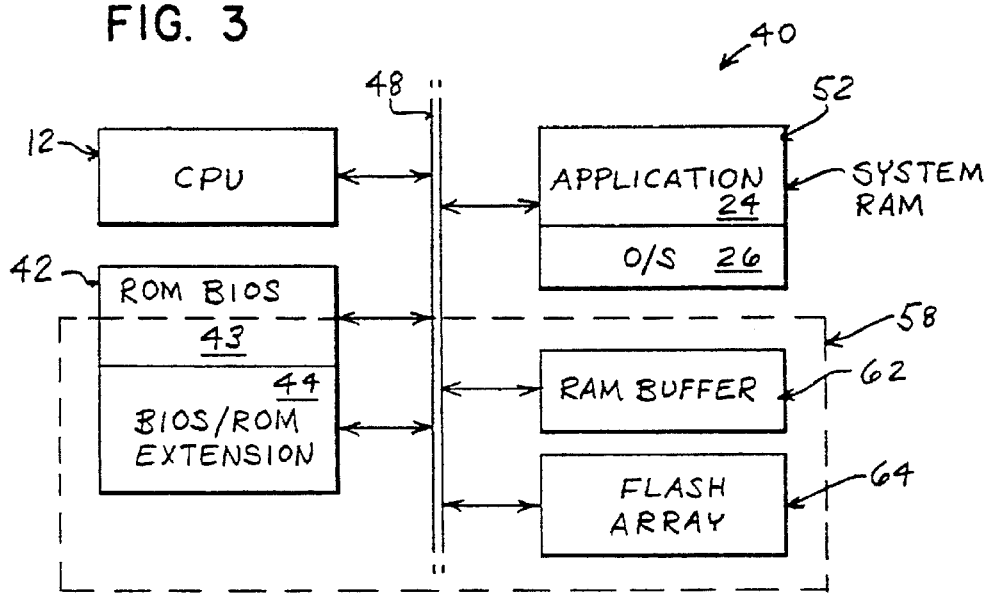
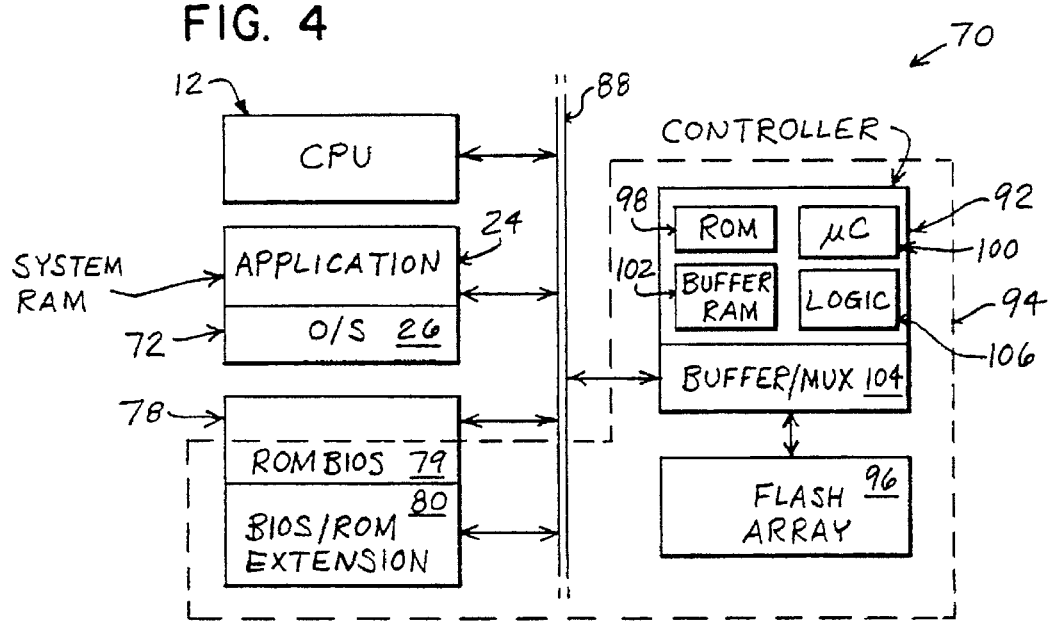
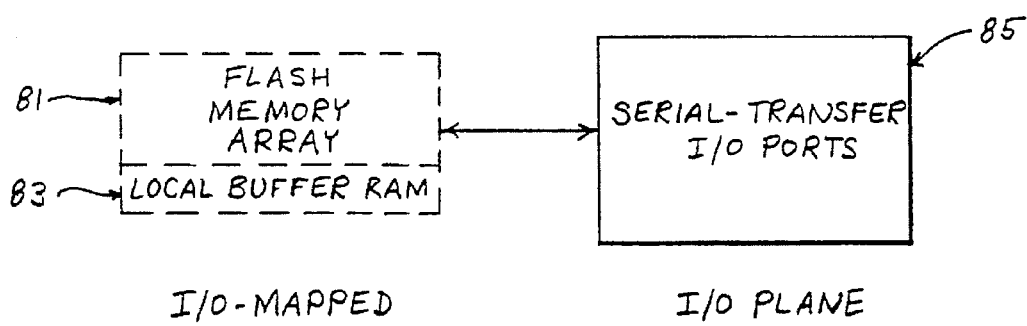

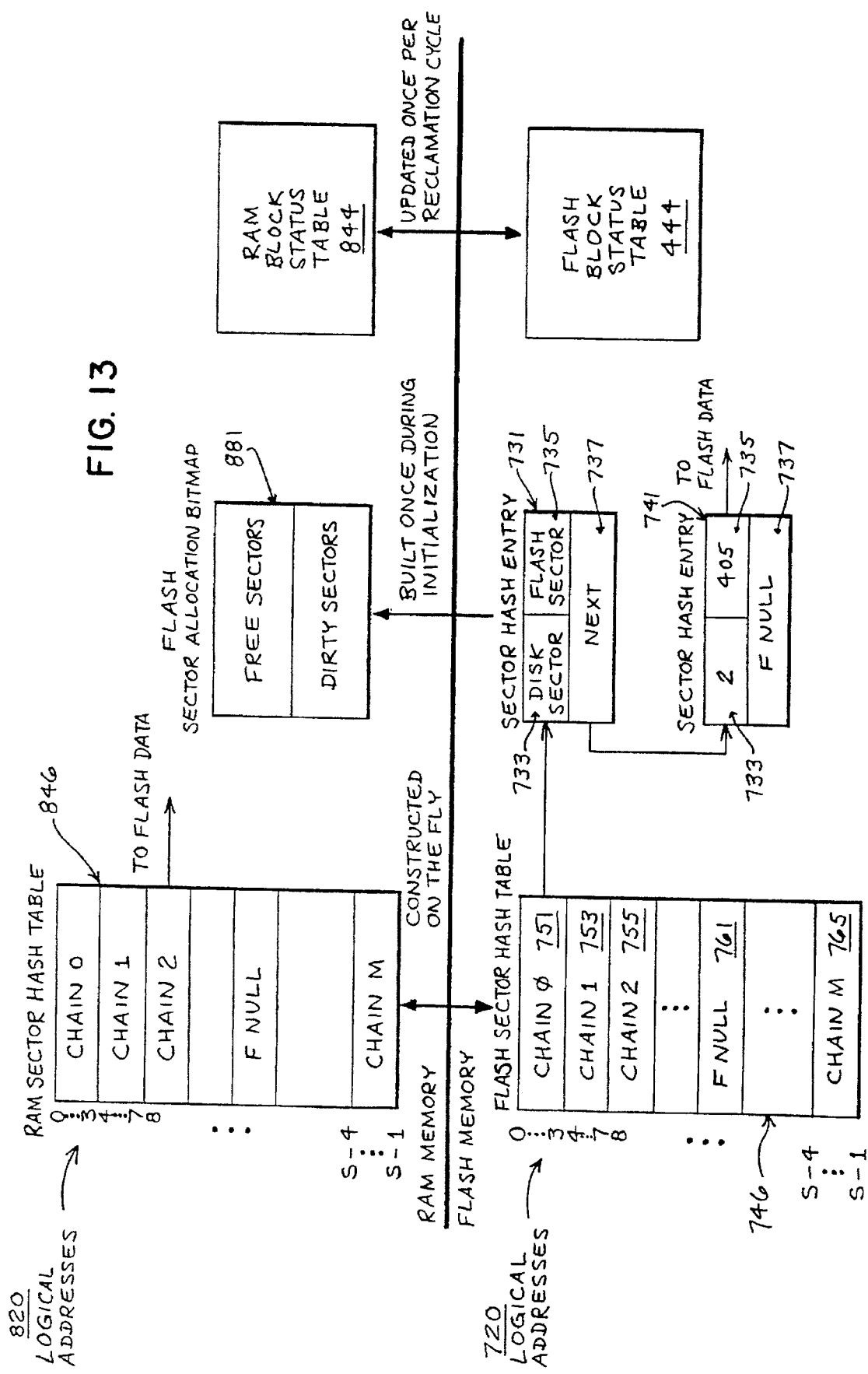

DISK EMULATION FOR A NON-VOLATILE SEMICONDUCTOR MEMORY UTILIZING A MAPPING TABLE

This is a continuation of application Ser. No. 08/293,413, filed Aug. 23, 1994, now abandoned, which is a continuation of application Ser. No. 07/635,988, filed Dec. 31, 1990, now abandoned.

FIELD OF THE INVENTION

The present invention pertains to the field of the architecture of computer storage systems. More particularly, the present invention relates to disk emulation on large-block erasable non-volatile semiconductor memory.

BACKGROUND OF THE INVENTION

Certain types of prior personal computer systems include a microprocessor (also referred to as a central processing unit) that is coupled to several types of storage systems—namely, a read only memory ("ROM"), a random access memory ("RAM"), a hard (i.e., fixed) disk drive for mass storage, and a floppy disk drive or drives for storage on removable magnetic floppy disks. The floppy disks are also referred to as diskettes. Those prior personal computer systems typically have an architecture that is especially geared to the storage systems that form a part of each of those prior personal computer systems.

A ROM in conjunction with a program called a ROM monitor stored in the ROM is referred to as firmware. A ROM basic input/output system ("BIOS") module is one type of ROM monitor that is stored in the ROM and used by the operating system for certain personal computers. The ROM BIOS module typically contains (1) drivers for certain hardware, including the keyboard, the disk drives, and the printer; (2) a power-on self-test program ("POST"); (3) a start-up routine that initializes the system; and (4) a loader program that reads the boot or first sector from a diskette or a hard disk.

After the personal computer is turned on, the POST program of the BIOS module is executed, the BIOS start-up routine performs certain initializations, and the loader program reads the contents of the boot sector from a diskette or from a hard disk. That boot sector contains a loader program of the operating system of the computer. That loader program of the operating system in turn loads part of the operating system from a diskette or a hard disk into RAM.

The operating system for the personal computer processes commands, controls program execution, and oversees the hardware and software resources of the computer system. One type of prior art operating system is MS-DOS sold by Microsoft Corporation of Redmond, Wash. The MS-DOS operating system includes the loader program discussed above, the MS-DOS BIOS, an MS-DOS kernel, a user interface, and utility programs.

The MS-DOS BIOS includes (1) new drivers that extend and use components of the drivers of the ROM BIOS; (2) an initialization routine for the MS-DOS BIOS drivers; and (3) another loader program.

The new drivers of the MS-DOS BIOS are also referred to as BIOS extensions or BIOS ROM extensions. In certain prior art personal computers, all input and output functions are driven by software contained in a 32 kilobyte or 64 kilobyte section of ROM and by smaller (typically 2 kilobyte) BIOS ROM extensions.

The initialization routine for the MS-DOS BIOS drivers displays a copyright notice and adjusts the interrupt table for the new drivers.

The loader program of the MS-DOS BIOS loads the rest of the operating system.

The MS-DOS kernel is a shell between the BIOS and the application program. The MS-DOS kernel initiates application program execution, allocates memory for the application programs, provides an application program interface between the application program and the hardware, and manages the reading and writing of the files.

The user interface of MS-DOS provides information to the user. The user interface provides a prompt, which prompts the user to enter commands. The user interface acts as the manager of the system when the operating system is in control.

The utility programs of MS-DOS provide certain useful functions for MS-DOS. Those functions include (1) formatting a diskette or a hard disk and (2) checking a diskette or a hard disk.

The hard disk and diskettes used with the above-referenced personal computer system are non-volatile storage systems, which means that data is not lost when the power to the computer is turned off. The hard disk and diskettes are types of block storage devices, which means that data is transferred to and from them in blocks.

On the hard disk and on the diskettes, data is physically stored on concentric tracks. Each track is made up of a plurality of sectors. A sector is typically fixed at 512 bytes in length. A disk controller and a physical device driver of a personal computer system typically always write to and read from disks in sector entities.

For MS-DOS, a cluster is the smallest logically addressable storage unit. For some hard disks, there are four sectors per cluster. For some other hard disks and for a high density 3.5 inch diskette, a cluster is a single sector.

Each partitioned area of a hard disk forms a logical subsystem that can contain its own operating system. A partition table in the first sector of a formatted hard disk contains information about the partitions.

A hard disk and a diskette are formatted before first being used. Low-level formatting divides each track into sectors and places identification ("ID") sector headers at uniform positions around the track. A high-level formatting establishes the clusters, initializes some disk areas, and prepares the disk for receiving data.

At the device driver and the BIOS level, disk requests are described by a "tuple" that indicates the drive, the head, the cylinder/track, the sector, and the length. The logical sector numbers are known at the DOS level and BIOS level. DOS reads from and writes to disks in cluster entities.

FIG. 1 shows the logical organization of a prior art MS-DOS operating system. For the MS-DOS operating system, a disk 2 is divided into two logical areas: a system area 4 and a data area 9. The system area contains a boot record 3, a file allocation table ("FAT") 5, and a root directory area 7 that contains root directory entries. The data area 9 contains files that are used to store application programs, data, and subdirectory information.

The boot record 3 includes a bootstrap loader program for loading the operating system. The boot record 3 also includes information as to the ASCII name of the formatting DOS, the number of bytes per sector of the disk, the number of sectors per cluster, the number of sectors in the boot record, the number of copies of the file allocation table entry (or cluster), the number of root directory entries, the number of sectors per partition, the disk type number, the number of sectors per file allocation table, the number of sectors per track, the number of sides per disk, the number of reserved or hidden sectors, the physical drive number, an extended boot sector signature, a volume identification, and a volume table.

The root directory 7 is a table of 32-byte entries that each set forth certain attributes of the file. Typically, each directory entry making up the root directory 7 includes a file name, a file extension, attribute flags, time and date stamps for the file, the starting cluster number for the clusters that make up the file, and the file size.

Each file on the disk is made up of one or more clusters. The file allocation table 5 contains a record in the form of a chain of how the clusters making up the file are linked together. A typical FAT 5 contains a list of two-byte entries, one for each cluster. For some prior FATs, the FAT entries are longer than two bytes. The length of each FAT entry depends upon the total number of clusters. The directory entry for a file contains the starting cluster number for the file, and the operating system uses that starting cluster number to access the file allocation table. Each FAT entry is a pointer to the next cluster of the file. Thus, the FAT entry retrieved by that first access contains the cluster number of the next cluster making up the file. The operating system uses that next cluster number to access the FAT to retrieve yet another cluster number, and continues this process until a special marker in FAT 5 is reached.

The file structure on the disk is tree-like. Entries in the root directory can be pointers to subdirectories. The subdirectories can be nested.

One disadvantage associated with the use of hard disks and diskettes in certain types of prior personal computers is that hard disk drives and floppy disk drives are relatively, physically large devices with a number of mechanical components. Large sizes contrast with the small size afforded by integrated circuits that make up many other pads of a personal computer. Moreover, the relatively large size of typical prior hard disk drives and floppy disk drives hinders portable personal computers from being even smaller and more portable.

Another disadvantage associated with prior hard disk drives and floppy disk drives is that they consume a relatively large amount of power compared with the integrated circuits making up other parts of the personal computer.

A further disadvantage associated with the prior hard disk drives and floppy disk drives is that they are prone to failure if exposed to excessive shock and vibration or to dust or other atmospheric contaminants.

Another type of prior non-volatile computer memory is the flash electrically erasable programmable read-only memory ("flash EEPROM"). The flash EEPROM can be programmed by the user, and once programmed, the flash EEPROM retains its data until erased. Electrical erasure of the flash EEPROM erases the entire contents of the memory of the device in one relatively rapid operation. The flash EEPROM may then be programmed with a new code.

One disadvantage of one type of prior flash EEPROM, however, is that each single bit cell cannot be overwritten from a logical zero to a logical one without a prior erasure. Another disadvantage of one prior type of flash EEPROM is that it must be erased—i.e., reset to a logical one state—in large blocks or in a manner that erases the entire device.

Another disadvantage of one prior type of flash EEPROM is that there is a finite limit on the number of erase and write cycles for the flash EEPROM before the flash EEPROM will fail.

The limitations with respect to overwriting and erasure associated with certain prior flash EEPROMs have, in certain instances, limited the usefulness of flash EEPROMs in personal computer systems.

SUMMARY AND OBJECTS OF THE INVENTION

One of the objects of the present invention is to provide disk emulation for a non-volatile semiconductor memory that is erased in blocks.

Another of the objects of the present invention is to provide disk emulation for a non-volatile semiconductor memory that is erased in blocks that includes a reserve block that helps to maximize the integrity and reliability of the file structure.

Another of the objects of the present invention is to provide a computer system that includes a non-volatile semiconductor memory that is erasable in blocks and that includes disk emulation.

A non-volatile semiconductor memory that is erased in blocks is described. The non-volatile semiconductor memory includes an active block for storing first data and a reserve block for storing second data. The second data is a copy of the first data. The copy is made during a clean-up operation prior to erasure of the active block. The non-volatile semiconductor memory also includes a mapping table for mapping a logical address of an allocation unit to a physical address of a sector within the non-volatile semiconductor memory.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 3 illustrates a personal computer system that includes (1) a flash memory array, (2) a file system driver contained within the ROM BIOS and the ROM BIOS extension, and (3) a RAM buffer for transferring files and for updating a directory of files.

FIG. 4 shows a personal computer system that includes a (1) flash memory array, (2) a file system driver stored in the ROM BIOS and the ROM BIOS extension, and (3) a separate system controller.

FIG. 5 shows a input/output mapped flash memory array.

FIG. 13 an example of a sector mapping table.

DETAILED DESCRIPTION

Figure 2:
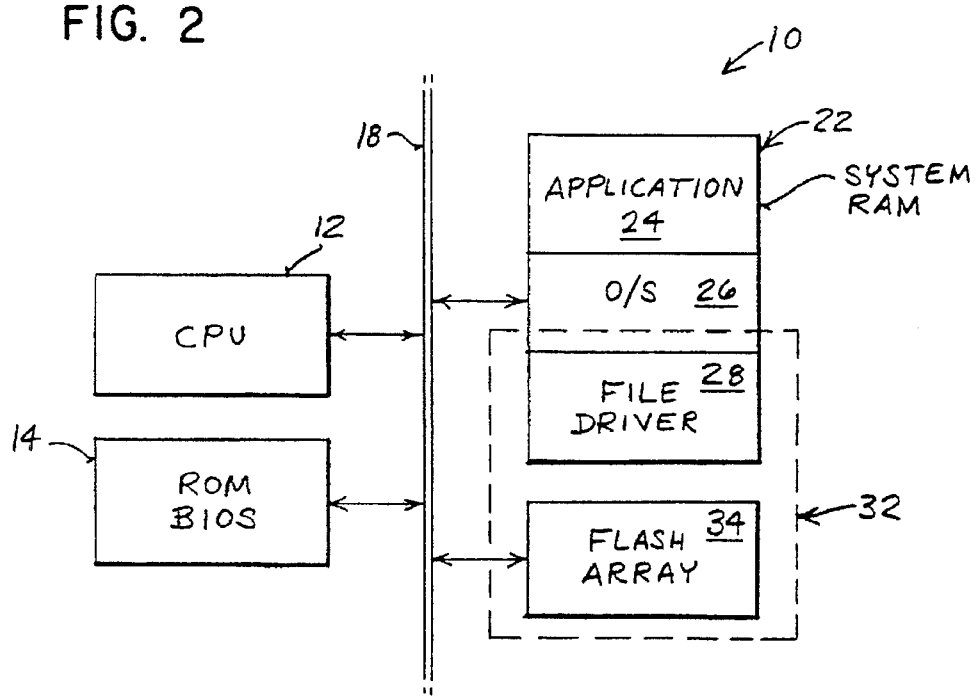
FIG. 2 shows a personal computer system with a flash array and with a file system driver stored in the RAM of the computer system.

FIG. 2 shows a personal computer system 10 with one preferred file system or structure 32. The file system 32 includes one or more flash EEPROMs that form flash memory array 34. A flash EEPROM is a type of semiconductor memory. File structure 32 also includes a software file system driver 28 that is stored in system RAM 22. Personal computer system 10 also includes central processing unit ("CPU") 12 and bus 18.

As described in more detail below, flash memory array 34 is structured so as to emulate either a fixed disk drive or a floppy disk drive.

System RAM 22 includes space for storage of application program 24. In one embodiment of the present invention, system RAM 22 is one megabyte in size. System RAM 22 also includes space for the storage of other application programs and for data. In one embodiment of the present invention, system RAM 22 includes one operating system 26 for computer system 10. In alternative embodiments, system RAM 22 further includes two or more operating systems.

System RAM 22 also includes file system driver software 28. The file system driver software 28 defines the file structure for flash memory array 34. In personal computer system 10, central processing unit 12 executes the foreground-task software routines of file system driver software 28 in order to handle all file system management utilities for flash memory array 34. The file system driver 28 and the file structure for a flash memory array are discussed in more detail below.

Not only does RAM 22 store application program 24, operating system 26, and file driver 28, but application program 24, operating system 26, and file driver 28 are also stored in flash memory array 34 during the times that computer 10 is either off or on. Flash memory array 34 can store more than one application program, more than one operating system, and more than one file driver. Flash memory array 34 also stores data files and directory information. Upon either a warm boot or a cold boot, the file system software driver 28 is loaded into system RAM 22 from flash memory array 34. In short, flash memory array acts as a mass storage device that replaces a hard disk.

Computer system 10 also includes ROM 14, which stores BIOS software for computer 10. In one embodiment of the present invention, the BIOS stored in ROM 14 includes both a 64 kilobyte BIOS with additional BIOS ROM extensions of two kilobytes each. The file system software driver 28 is stored prior to execution in flash memory array 34 rather than in ROM 14.

Upon execution of ROM BIOS program 14 after power-up of computer 10, file driver 28 and operating system 26 are loaded into system RAM 22 from flash memory array 34 via bus 18. The user of computer 10 then uses operating system 26 to load application program 24 into RAM 22. The user of computer 10 can also load data, other application programs, and other operating systems into system RAM 22.

In one embodiment of the present invention, flash memory array 34 is erased in blocks, wherein each block comprises a large number of bits. In an alternative embodiment, flash memory array 34 is erased in its entirety.

Flash memories differ from conventional electrically erasable programmable read only memories ("EEPROMs") with respect to erasure. Conventional EEPROMs use a select transistor for individual byte erase control. Flash memories, on the other hand, achieve much higher density with single transistor cells. During the erase mode, a high voltage is supplied to the sources of every memory cell in a block or in the entire chip simultaneously. This results in a full array or a full block erasure.

For flash memory array 34, a logical "one" means that few if any electrons are stored on a floating gate associated with a bit cell. A logical "zero" means that many electrons are stored on the floating gate associated with the bit cell. After flash memory array 23 has been erased, a logical one is stored in each bit cell of flash memory array 23. Each single bit cell of flash memory array 23 cannot be overwritten from a logical zero to a logical one without a prior erasure. Each single bit cell of flash memory array 23 can, however, be overwritten from a logical one to a logical zero, given that this entails simply adding electrons to a floating gate that contains the intrinsic number of electrons associated with the erased state.

Flash memory array 34 can be programmed in one of three ways: (1) a single bit at a time, (2) a single word at a time, or (3) group of words at a time. A word consists of a plurality of memory bits associated with a single memory system address or a single device. The groups of words programmed at a time can be as large as an erase block of flash memory array 34. Program operations with respect to flash memories are also referred to as write operations.

As discussed above, each bit of flash memory array 34 cannot be overwritten from a logical zero state to a logical one state without a prior erasure. This necessity for erasure prior to overwriting from a logical zero to a logical one introduces a functional operation associated with a flash memory.

Flash memory array 34 stores both executable code and non-executable data. In the detailed description that follows, the generic term "data" is used to refer to either (1) non-executable data alone or (2) both executable code and non-executable data.

The read operation associated with flash memory array 34 closely resembles the read operation associated with other read-only memory devices. In one embodiment, a read operation for flash memory array 34 takes on the order of 135 nanoseconds. Write and erase operations for flash memory array 34 are, however, significantly slower. In one embodiment of the present invention, erase times for a block of flash memory array 34 are on the order of one second. Write operations for a single word of flash memory array 34 take on the order of 10 microseconds. Thus, the read, write and erase operations associated with flash memory array 34 have an asymmetrical nature—the write and erase operations are significantly slower than the read operations.

In addition, each flash memory of flash memory array 34 has a finite endurance lifetime with respect to erase plus write (i.e., program) operations. For example, in one embodiment, flash memory array 34 can withstand a minimum of 10,000 erase/program cycles before flash memory array 34 begins to fail or exhibits erase/write performance degradation. Thus, in one embodiment of the present invention, there is a limit as to the number of erase/write cycles that flash array 34 can be put through. On the other hand, there is no such maximum lifetime with respect to the number of times flash memory array 34 can be read from.

In one embodiment of the the present invention, each flash memory device comprising flash memory array 34 has multiple erase blocks within each memory device. For that embodiment, there are restrictions on the erase/programming cycling of adjacent blocks. Adjacent blocks are blocks that share either common row connections or common column connections. The restrictions on the cycling of adjacent blocks are made to prevent electrical data disturb conditions.

A more frequently cycled block is referred to a hot block. A block that is not cycled or is cycled less frequently is referred to as a cold block. The important parameter is the difference between the number of cycles associated respectively with adjacent blocks. A hot block can eventually reach a cycle count such that data is adversely affected in a cold block of flash array 34. One way to avoid this hot block/cold block interaction is to place cycle restrictions on hot blocks of flash army 34. Another way to minimize the adverse effects of hot block/cold block interaction is to periodically erase and reprogram the cold blocks of flash array 34. The periodic erase and reprogramming of cold blocks is referred to as the refreshing of cold blocks.

As described in more detail below, the preferred file structures of the present invention take into account the above referenced functional characteristics of the flash EEPROMs that make up flash array 34.

FIG. 3 shows personal computer system 40 with one preferred file structure 58. Personal computer system 40 includes central processing unit 12 and ROM 42. ROM 42 stores BIOS software 43 and BIOS extension software 44. Personal computer system 40 also includes bus 48 and system RAM 52. System RAM 52 stores application program 24 and operating system 26. Personal computer system 40 also includes RAM buffer 62 and flash memory array 64.

RAM buffer 62 provides buffering for the transferring of files between flash memory array 64 and system RAM 52. RAM buffer 62 also provides buffering for the construction of or the updating of a directory for the files stored in flash memory array 64.

One or more flash EEPROMs make up flash memory array 64. Flash memory array 64 stores application program 24, operating system 26, data, other application programs, and other operating systems. Operating system 26, application program 24, and other programs and data can be transferred to system RAM 52 from flash memory array 64 via bus 48.

File structure 58 includes flash memory array 64, RAM buffer 62, ROM BIOS extension software 44, and a portion of ROM BIOS software 43.

The file system driver software that defines the file structure for flash memory array 64 forms part of ROM BIOS software 43 and ROM BIOS extension software 44 in ROM 42. In the embodiment shown in FIG. 3, the file system driver is part of and integral to the firmware of personal computer system 40. BIOS 43 and BIOS extension 44 are memory blocks that are either direct-mapped or paged. Therefore, in the embodiment shown in FIG. 3, the file system driver software is neither stored in system RAM 52 nor stored in the flash memory array 64.

In the embodiment shown in FIG. 3, a BIOS Interrupt 13H extension is provided as part of BIO/ROM extension 44. That Interrupt 13H extension is patched into the standard Interrupt 13H vector during initialization. BIOS requests not targeted for flash memory array 64 are forwarded to the old BIOS Interrupt 13H handler.

FIG. 4 illustrates a personal computer system 70 with yet another preferred file structure 94. Personal computer system 70 includes a central processing unit 12 and system RAM 72. In one preferred embodiment, system RAM 72 includes an application program 24 and an operating system 26. Personal computer system 70 also includes a bus 88 and a ROM 78. ROM 78 includes BIOS software 79 and BIOS extension software 80.

Personal computer system 70 also includes controller 92 and flash memory array 96. Flash memory array 96 is comprised of flash EEPROMs. Flash memory array 96 stores application program 24, operating system 26, data, other application programs, and other operating systems, which can be loaded into system RAM 72 via bus 88.

File structure 94 is comprised of controller 92, flash memory array 96, ROM BIOS extension 80, and a portion of ROM BIOS 79.

Personal computer system 70 shown in FIG. 4 has a fully hardware driven file structure for flash memory array 96. Controller 92 is specifically dedicated to defining and controlling the file structure for flash memory array 96. Controller 92 includes a microcontroller 100 for overseeing control.

Controller 92 also includes control logic 106. In one preferred embodiment of the present invention, control logic 106 comprises a programmable logic array ("PLA"). Logic circuitry 106 contains the digital logic that controls the operation of controller 92.

In one embodiment, controller 92 includes ROM 98 that stores file system driver software. The file system driver software is executable by microcontroller 100 and defines the file structure for flash memory array 96.

In an alternative embodiment, file system driver software that is executable and defines the file structure for flash memory array 96 forms part of ROM BIOS software 79 and BIOS ROM extension software 80.

Controller 92 includes buffer RAM 102. Buffer RAM 102 provides buffering for the transferring of files and for the creation and updating of directories.

Controller 92 also includes buffer/multiplexer 104. Buffer/multiplexer 104 provides buffering for the transferring of files. Buffer/multiplexer 104 also multiplexes data passed to and from flash memory array 96.

The logic associated with logic buffer-multiplexer circuit 104 can conform to any standard system bus interface. For example, the logic associated with buffer/multiplexer 104 can conform to one or more of the following standards: PC XT, PC AT (i.e., IDE—Industry Standard Architecture), EISA (i.e., Extended Industry Standard Architecture), MCA (i.e., Micro-Channel Architecture), VME (i.e., Virtual Machine Environment), and Multibus.

In one embodiment of the invention, controller 92 is contained within personal computer system 70. For example, controller 92 could reside on a system board (not shown) within personal computer 70.

In an alternative embodiment, controller 92 can be an input/output ("I/O") device that resides external to personal computer system 70 or within an expansion slot (not shown) of personal computer system 70. For that alternative embodiment, the logic associated with buffer/multiplexer 104 can conform to any standard I/O interface. For example, buffer/multiplexer 104 can conform to one or more of the following I/O interfaces: IDE, ST506, SCSI (i.e., Small Computer System Interface), and SA400 (i.e., a floppy disk standard). Thus, for that alternative embodiment, personal computer 70 would communicate with controller 92 by way of one of those standard I/O interfaces.

Personal computer system 40 of FIG. 3 and personal computer system 70 of FIG. 4 each include hardware that is dedicated to controlling the file structure of the respective flash memory array. For personal computer system 40, that additional hardware is RAM buffer 62. For personal computer system 70, that additional hardware is controller 92. RAM buffer 62 of FIG. 3 and controller 92 of FIG. 4 provide means for avoiding the necessity for storing file system control code in system RAM 52, flash memory array 64, system RAM 72, or flash memory array 96, respectively.

RAM buffer 62 and controller 92 each also serve to buffer data, so that system RAM 52 of FIG. 2 and system RAM 72 of FIG. 4 need not act as data buffers for file structures 58 and 94, respectively. Moreover, the inclusion of data buffer 62 in personal computer system 40 and controller 92 in personal computer system 70 means that system RAM 52 and system RAM 72 need not act as scratch pad areas for the file structures for flash memory arrays 64 and 96, respectively.

RAM buffer 62 of FIG. 3 and controller 92 of FIG. 4 allow file structure 58 and file structure 96 to each be recognized as containing a bootable storage area that is part of the basic system hardware for the respective personal computer system. The result is that RAM buffer 62 and controller 92 serve to improve the overall performance of the file structures of the flash memory arrays for the respective personal computer systems.

The different configurations of personal computers 10, 40, and 70 shown in FIGS. 2–4 result in different characteristics of the computers. In the computer system 10 of FIG. 2, file driver 28 is executed by central processing unit 12 as a foreground-task software routine that handles all the file management utilities for managing flash array 34. File system driver 28 takes up a portion of system RAM 22, but the size of system RAM 22 might be limited. For example, if operating system 26 of personal computer system 10 is MS-DOS, then system RAM 22 may be limited to one megabyte of "real mode" space.

For computer system 40 of FIG. 3, the file system driver software that defines the file structure for flash memory array 64 forms part of ROM BIOS software 43 and ROM BIOS extension software 44 in ROM 42. The amount of storage space in ROM 42 may be limited, however. For example, in certain MS-DOS compatible personal computers, all input-output functions are driven by firmware contained in a 64 kilobyte BIOS section of ROM with smaller BIOS ROM extensions of two kilobytes each. The file system driver software might exceed the space available in ROM 42 if ROM 42 is small in size.

In contrast, hardware controller 92 for computer system 70 stores the file driver, and this reduces the memory requirements with respect to flash array 96, ROM 78, and system RAM 72. Moreover, hardware controller 92 simplifies the file system control commands. For example, hardware controller 92 converts the file system control commands to high level procedure calls that are software accessible by a label referring to code residing in some other memory space. In one embodiment of the present invention, the simplified file system control commands or file driver control commands are stored in ROM 98 of hardware controller 92 as conventional BIOS-type control code. This in turn allows the solid-state file system 94 to be recognized as a basic bootable device. This results in simplified file system calls. Each file system call results in the execution of the file system driver (which is also referred to as the file system control code).

In one embodiment, each file system call for a computer system 70 of FIG. 3 is executed directly by CPU 12 fetching instructions from the main BIOS and direct-mapped BIOS extensions stored in ROM 78. In another embodiment, each file system call is executed by CPU 12 from memory pages residing at BIOS extension memory blocks stored in ROM 98. In yet another embodiment, each file system call is executed by microcontroller 100 from the file system driver stored in ROM 98 of hardware controller 92.

In a preferred embodiment, hardware controller 92 reduces each file related task to a single command from the host CPU 12, which helps to increase the off loading of the host CPU 12. Controller 92 accepts incoming data at RAM type memory speeds by holding the incoming data in local RAM buffer space 102. Hardware controller 92 completes each given task automatically, but only handles one operation at a time.

In addition, controller 92 allows host CPU 12 to interrupt any file system task for a immediate data access. This requires the additional RAM buffering of any valid file information that might otherwise reside in an inaccessible block. An inaccessible block is one involved with a write or an erase operation. The controller 92 resumes the original task following the interrupt. In one embodiment of the present invention, control hardware 92 cues up a given number of simultaneous write tasks.

Furthermore, in one embodiment, controller 92 continuously monitors the main flash memory storage array 96 for available free space and hot/cold block cycle imbalances. Hardware controller 92 also automatically initiates a redistribution operation with respect to flash memory 96 as needed. A redistribution operation evens out the cycling among blocks of flash memory array 96. The redistribution operation is automatically initiated by hardware controller 92 as needed in a fully background-task fashion.

Hardware controller 92 also automatically initiates a clean-up operation with respect to flash memory array 96 in order to free space for storage in flash memory 96. The clean-up operation is initiated by hardware controller 92 as needed and is done in a fully background-task fashion. The clean-up operation is described in more detail below.

In order for file system control hardware 92 to continuously monitor flash memory array 96 for available free space and hot/cold block cycle imbalances, and for controller 92 automatic initiate clean-up or redistribution operations, flash memory 96 should either (1) be resident as a storage device within personal computer system 70 or, alternatively, (2) be securely physically interlocked to personal computer system 70 if flash memory array 96 is removable. For the alternative embodiment wherein flash memory array 96 is removable, personal computer system 70 includes an indicator light-emitting diode ("LED") that is lit when a background task involving flash memory array 96 is occurring. The user of personal computer 70 is instructed not to remove flash memory array 96 when the LED is lit and, accordingly, when a background task is occurring.

In one embodiment, controller 92 is coupled to a small battery that provides back-up power to controller 92 if power to personal computer system 70 is removed. This helps to ensure that data transfers to flash array 96 from buffer RAM 102 are completed even if power to the computer system is removed.

In another embodiment of the invention, however, no battery back-up of controller 92 is included.

It is to be appreciated that for the embodiments shown in FIGS. 2–4, flash memories arrays 34, 64, and 96 could be used to replace either fixed disk drives or floppy disk drives.

In preferred embodiments, the interface circuitry to a main flash memory array can be either (1) input/output ("I/O") mapped, (2) paged memory mapped, or (3) direct memory mapped. FIG. 5 illustrates a I/O mapping scheme for the interface circuitry.

The I/O mapping scheme shown in FIG. 5 uses an I/O plane 85 comprising serial transfer I/O ports that maps to flash memory array 81 and local buffer RAM 83. Because the the I/O mapping scheme shown in FIG. 5 uses the separate I/O memory plane 85 instead of a main memory plane, (main memory is also referred to as system RAM), the I/O mapping scheme shown in FIG. 5 consumes none of the host computer's main memory space—that is, the I/O mapping scheme consumes none of the host computer's system RAM.

The I/O devices coupled to serial transfer I/O ports 85 cannot, however, support direct execution by a central processing unit given that those I/O devices (not shown) are serial rather than random access devices. Those I/O devices must download code files to system RAM for execution.

Figure 6:
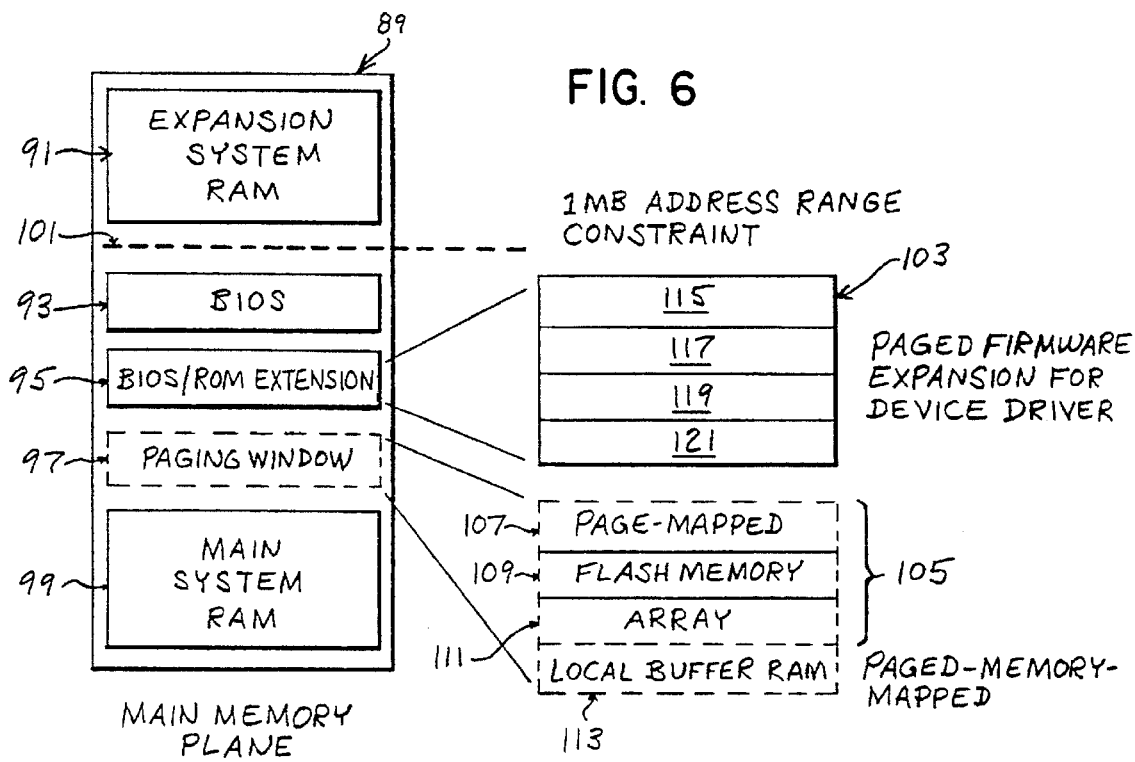
FIG. 6 shows a paged-mapped flash memory array structure.

FIG. 6 illustrates a paged memory mapped interface to a paged map flash memory array 105. FIG. 6 shows main memory plane 89. Main memory plane 89 includes main system RAM 99, paging window 97, BIOS/ROM extension 95, BIOS 93, and expansion system RAM 91.

In one embodiment of the present invention, main memory plane 89 has a one megabyte address range constraint 101. The one megabyte address range constraint for main memory plane 89 means that the protected mode of a CPU or microprocessor is used to address portions of main memory plane 89 above the one megabyte address constraint 101. In other words, the protected mode of a CPU is used to address the expansion system RAM area 91 of main memory plane 89.

Typical early generation and low performance microprocessors did not include a protected mode. Moreover, typical early generation and low performance operating systems for personal computing systems did not have the capability for handling protected mode addressing. Therefore, those low performance microprocessors and operating systems could not address the areas above the one megabyte address. Nevertheless, certain high performance and later generation microprocessors and operating systems can address areas above the one megabyte address.

In FIG. 6, flash memory array 105 is comprised of small pages 107, 109, and 111 and flash memory array 105 is coupled to local buffer RAM 113. In an alternative embodiment of the present invention, flash memory array 105 could be comprised of any number of pages.

In FIG. 6, paging window 97 is the paged memory mapped interface that allows direct host central processing unit access to pages 107, 109, and 111 of flash memory array 105. Each page is changed to point to a different flash memory array 105 segment as needed.

FIG. 6 also shows paged firmware 103 that is used as an expansion for a device driver. Paged firmware 103 includes pages 115, 117, 119, and 121. In one embodiment of the present invention, paging window interface 97 is used to point to paged firmware 103. Having paging window 97 point to paged firmware 103 allows expansion to the larger firmware storage space 103. This gives the computer system additional storage space beyond a single (typically 2 kilobyte) BIOS/ROM extension location 95.

Figure 7:
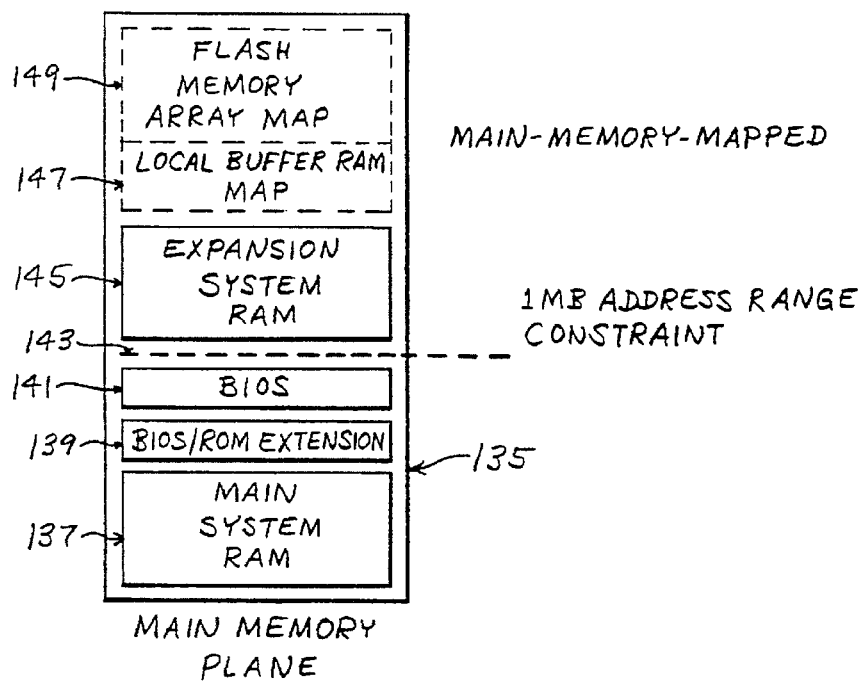
FIG. 7 shows a direct memory mapped flash memory array structure.

FIG. 7 illustrates a direct memory mapped interface to a main flash memory array. In FIG. 7, main memory plane 135 includes flash memory array map 149 and local buffer RAM 147 in addition to main system RAM 137, BIOS/ROM extension 139, BIOS 141, and expansion system RAM 145.

The main memory plane 135 shown in FIG. 7 has a one megabyte address range constraint 143. Flash memory array map 149 and local buffer RAM map 147 reside above the 1 megabyte address range constraint 143 of memory plane 135. This means that a protected mode of a CPU or microprocessor is used to address flash memory array map 149 and local buffer RAM map 147. In contrast, the CPU can address the main system RAM 137, the BIOS/ROM extension 139, and the BIOS 141 of main memory plane 135 without using the protected mode.

Flash memory array map 149 directly maps to the flash memory array of the personal computer system. Therefore, the flash memory array map 149 is equal in size to the flash memory storage array of the personal computer system.

Moreover, the local buffer RAM map 147 is directly mapped to the local buffer RAM of the personal computer system. It follows that the local buffer RAM map 147 is equal in size to the local buffer RAM of the personal computer system.

The direct memory mapped scheme thus employs a large amount of main memory space. In addition, the direct memory mapped method requires a CPU and operating system capable of addressing portions of the main memory plane above the 1 megabyte address range constraint 143.

The direct mapped scheme allows direct code execution from all of the flash memory army. On the other hand, the paged mapped scheme allows direct code execution from a portion of the flash memory array.

The direct mapped scheme requires a CPU and operating system capable of addressing beyond the one megabyte constraint. In contrast, the paged mapped scheme works with a CPU and operating system incapable of addressing beyond the one megabyte constraint.

Figure 8:
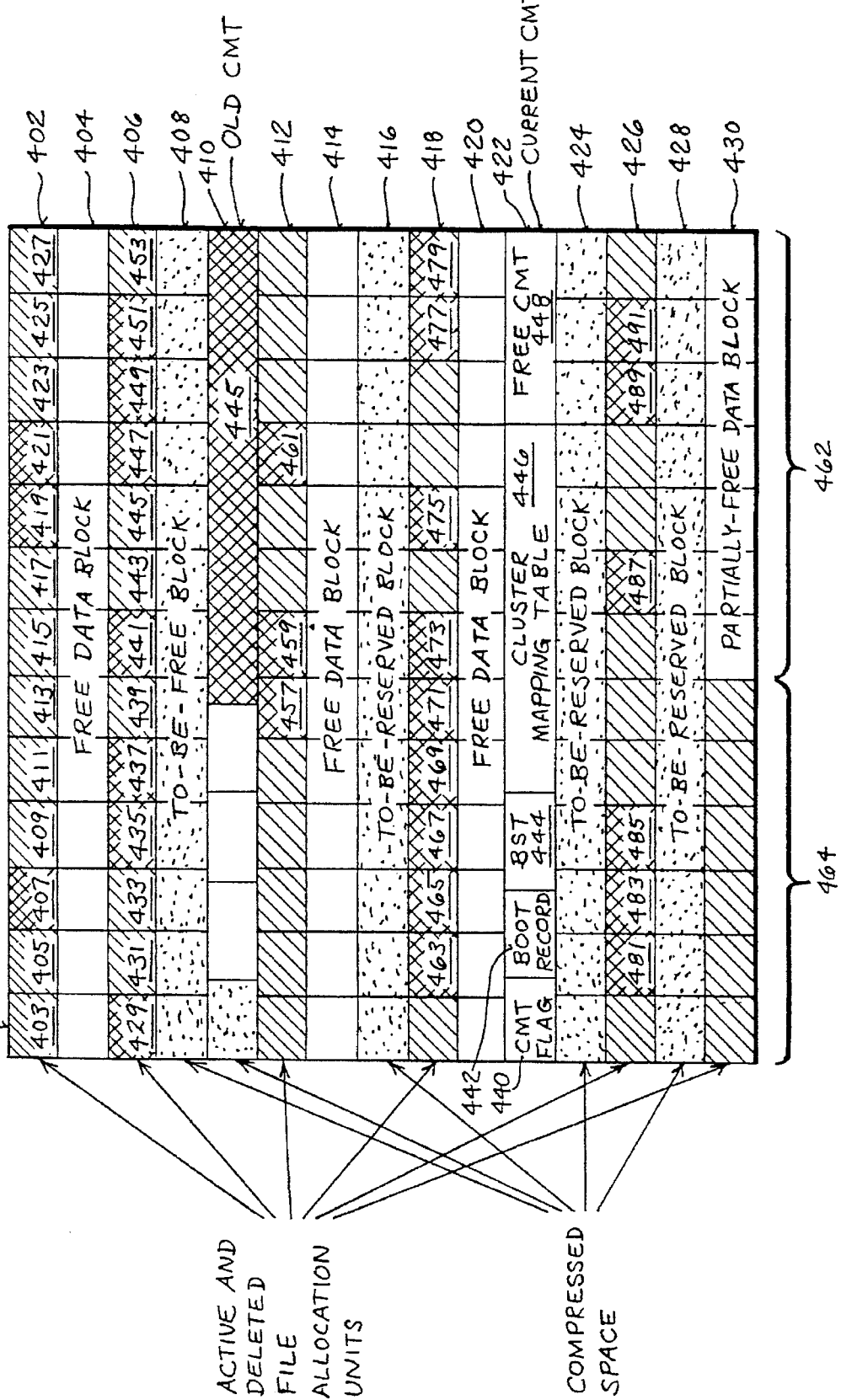
FIG. 8 shows a flash EEPROM with a sectored file structure and a cluster mapping table.

FIG. 8 shows file structure 400 of flash memory array 401. File structure 400 is a file structure that includes sectors and provides disk emulation. File structure 400 is also referred to as a sectored file structure.

In a sectored file structure such as file structure 400, code or data is stored in sectors. Each sector is a fixed length. For file structure 400, each sector comprises 512 physical bytes.

The sectors are analogous to sectors on prior art hard disks and diskettes of a personal computer system. On a prior art hard disk, there are typically 17 sectors per track.

For the MS-DOS operating system, a cluster is a smallest logically addressable storage unit. For some prior art hard disks, there are four sectors per cluster. For a hard disk and for a high density 3.5 inch diskette, a cluster comprises a single sector.

For file structure 400 of FIG. 8, each cluster is an allocation unit ("AU"). For file structure 400, a cluster is made up of a single sector.

In an alternative embodiment of the present invention, each cluster is made up of two sectors. In yet another alternative embodiment, each cluster is made up of three or more sectors.

In yet another alternative embodiment (discussed below), a logical sector rather than a cluster is an allocation unit for the file structure.

The sectored file structure of file structure 400 of FIG. 8 provides for emulation of conventional disk file structures and is similar to the sectored file structure found on hard disk drives and floppy disk drives.

Sectored file structure of file structure 400 allows random selection of erase blocks for clean-up. This in turn helps to reduce file movement when such file movement is unnecessary. This also helps to reduce excess cycling.

A sectored file structure cannot, however, support complete contiguous execution in place of code files. Nevertheless, a contiguous sector-paged memory file scheme does allow large contiguous portions or smaller code files to execute in place.

For a sectored file structure, the cycling of individual blocks must be tracked to support the active management of hot/cold erase block redistribution during clean-up. This cycling of individual blocks is intrinsically managed by the clean-up/reallocation rules discussed below.

Flash memory array 401 includes a number of data blocks for storing code or data. As used herein, the term "data" is intended to include either executable code or non-executable data or both. FIG. 8 illustrates an example of the file structure of flash memory array 401 in the state immediately following a clean-up operation.

Blocks 416, 424, and 428 of flash memory array 401 are "to-be-reserved" blocks, which are also referred to as reserve blocks or reserved blocks. Reserve blocks are blocks that provide temporary file back-up during a clean-up operation.

In one embodiment of the invention, a clean-up operation can be triggered either if (1) the available flash storage capacity drops to a certain (configurable) limit; (2) a user explicitly requests a cleanup, wherein the cleanup is performed by a special clean-up utility program, such as a terminate and stay resident program in RAM of the personal computer system; or (3) a (configurable) time interval has passed that triggers the clean-up. A clean-up operation is also referred to as a reclamation cycle.

A clean-up operation first involves a reallocation operation. During a reallocation operation, all currently active files are moved out of blocks that will eventually be erased. These currently-active files are moved to reserve blocks. Each flash memory block to be erased is erased all at once. For file structure 400, the reserve blocks 416, 424, and 428 are available for reallocation during a clean-up operation. Reserve blocks 416, 424, and 428 thus provide temporary file backup.

Block 408 is a to-be-free block that becomes a free block after the next clean-up operation.

Blocks 404, 414, and 420 are free blocks that are usable blocks for storing code and data. For the moment in time shown in FIG. 8, free blocks 404, 414, and 420 are not active blocks. Instead, blocks 404, 414, and 420 are to be used for future storage of code or data. At the point in time illustrated in FIG. 8, the data and code for active files are stored in active sectors of blocks 402, 406, 412, 418, 426, and 430. During further operation of the personal computer system, data or code is additionally placed in sectors in the free blocks 404, 414, and 420.

Data block 430 is a partially free block. A portion 464 of block 130 contains code or data stored in active sectors. The portion 462 of block 130 is free space available for storage of code or data. During the further operation of the personal computer system, code and data is also placed in portion 462 of block 430.

As the sectors within the free and partially free blocks are filled with code and data, the number of blocks that remain free of data or code diminishes. When the number of free, usable blocks reaches the allowed number of reserve blocks, a clean-up operation is initiated.

The sectors within blocks 402, 406, 412, 418, and 426, together with the sectors within portion 464 of block 430, comprise the active and deleted files and subdirectories. Sectors 403, 405, 409, 411, 413, 415, 417, 423, 425, and 427 within block 402 and sectors 431, 433, 439, 443, 445, and 453 within block 406 are examples of active file and subdirectory sectors. Blocks 412, 418, 426, and 430 also include active file and subdirectory sectors. Sectors 407, 419, 421, 429, 435, 437, 441, 447, 449, 451, 457, 459, 461, 463, 465, 467, 469, 471, 473, 475, 477, 479, 481, 483, 485, 487, 489, and 491 are the file sectors containing deleted files and subdirectories.

When clean-up is required, the personal computer system identifies which blocks are to be cleared for a subsequent rewrite. In other words, upon clean-up the personal computer system identifies the blocks having files that are to be reallocated and moved upon clean-up. The identification of blocks to be cleared upon clean-up is governed by two rules. The first rule is that the least cycled block is selected. This reduces the cycling imbalances between hot and cold blocks.

If there are not large disparities between cycle counts of blocks, then the second rules governs. In other words, where cycling distribution is not flagged as a problem by the personal computer system, then the second rule governs. The second rule states that the blocks with the highest number of deleted sectors are the blocks that are selected to be cleared.

The reason for this second rule is that the sectors containing deleted files or deleted subdirectories do not need to be moved out of a block prior to erasure. The deleted files and deleted subdirectories contain no information that must be saved, so the deleted files and deleted subdirectories can be erased as part of the clean-up operation. In other words, there needs to be no reallocation of deleted files or deleted subdirectories. The second rule thus results in a minimal amount of moving out of active sectors prior to the erasure that is part of a clean-up operation.

It is an essentially random process that governs which blocks contain the most deleted file sectors. Therefore, the second rule means that the clean-up scheme results in a largely random block selection with respect to the blocks to be cleared. This essentially random block selection helps to increase the clean-up efficiency while, at the same time, minimize overall cycling disparities.

The above rules one and two together manage the cycling distributions within flash memory array 401. Rules one and two together help to minimize cycling differentials. It follows that the clean-up of file structure 400 is essentially random.

A compression operation occurs during the clean-up operation so that the three blocks 406, 418, and 426 can fit into the reserve blocks 416 and 424. During the compression operation, files previously deleted by the user are not rewritten into blocks 416 and 424. The compression operation is also referred to as compaction.

In FIG. 8, sectors 429, 435, 437, 441, 447, 449, 451, 463, 465, 467, 469, 471, 473, 475, 477, 479, 481, 483, 485, 487, 489, and 491 residing within blocks 406, 418 and 426 contain deleted files and subdirectories. Those deleted sectors are not rewritten into blocks 416 and 424. Blocks 406, 418 and 426 are said to reside in the next area to be compressed. After clean-up, blocks 416 and 424 are said to form part of the compressed space. The amount of compressible space for blocks 406, 418, and 426 is the amount of space taken up by the deleted sectors 429, 435, 437, 441, 447, 449, 451, 463, 465, 467, 469, 471, 473, 475, 477, 479, 481, 483, 485, 487, 489, and 491.

After blocks 406, 418, and 426 are compressed into blocks 416 and 424, then blocks 406, 418, and 426 are erased. After blocks 406, 418 and 426 are erased, they become reserve blocks. Block 428 remains a reserve block. Block 408 remains a free block.

File structure 400 uses cluster mapping table 446 that maps logical clusters to the physical sectors of file structure 400. Cluster mapping table 446 provides a link between the physical sectors of file structure 400 and the outside world. Cluster mapping table 446 makes file structure 400 appear to the outside world as if flash memory array 401 were a conventional fixed disk or floppy disk with adjacent sectors. In reality, of course, flash memory array 401 differs from a conventional fixed disk or floppy disk given the fact that flash memory array 401 can only be erased in blocks and that file structure 400 includes a clean-up operation. Cluster mapping table 446 overcomes these differences by mapping logical sectors called for by the personal computer system to the physical sectors of flash memory array 401.

Cluster mapping table 446 resides within block 422 of flash memory array 401. Block 422 is referred to as the cluster mapping block or the flash disk emulation block. Block 422 also contains cluster mapping table flag 440, flash disk emulation ("FDE") boot record 442, flash disk emulation configuration block status table 444, and free space 448. Free space 448 provides room for expansion for cluster mapping table 446.

Cluster mapping table flag 440 stores a pattern of data that indicates which block stores the cluster mapping table for file structure 400. Cluster mapping table ("CMT") flag 440 stores a unique non-random data pattern that indicates that the block containing CMT flag 440 is also the block containing the cluster mapping table. For example, in one embodiment, CMT flag 440 stores a series of repeating AAh/55h data. In another embodiment, CMT flag 440 stores some other non-random sequence of data.

In one embodiment of the present invention, a supplemental check is done to determine if a particular block is, in fact, the cluster mapping block. The check is done to help avoid an error in locating the cluster mapping block that might otherwise occur if a block other than the cluster mapping block had a beginning pattern of data matching the pattern of data of CMT flag 440. The supplemental check is done by checking a checksum data field residing in the flash disk emulation boot record 442 of cluster mapping block 422. In one embodiment, the checksum data field in boot record 442 is a particular pattern chosen because that pattern of data does not change if FDE boot record 442 is both valid and current. In another embodiment, the checksum data field in FDE boot record 442 is a dedicated cycle redundancy check ("CRC") or error correction code ("ECC") data field. First, the computer system looks for the CMT flag. Second, the computer system checks the checksum data field. A correct result from the checking of the checksum data field in FDE boot record 442 tells the computer system that it, in fact, has found the current valid cluster mapping block for flash memory array 401.

As shown in FIG. 8, flash disk emulation boot record 442 resides within block 422 next to CMT flag 440. FDE boot record 442 contains information regarding the particular file system type and the particular file system revision of file structure 400. FDE boot record 442 also contains certain file system parameters. Those parameters include formattable capacity information, reserved block information, appended cluster mapping table information, information relating to an old cluster mapping table, and information relating to the current cluster mapping table.

The formattable capacity information is the size of the area of flash memory array 401 that can be formatted to store code and data. The reserved block information identifies which blocks are the reserve blocks. As discussed above, the reserved blocks are blocks used during clean-up and reallocation operations. The appended cluster mapping table information is the location of any additional blocks that are being used for storage of additional cluster mapping table information. In one embodiment, an appended cluster mapping table stored in one or more additional blocks is used if the number of cluster mapping table entries exceeds a certain amount. An old CMT is a backup copy of the current cluster mapping table. The parameter information relating to the old cluster mapping table is the location within flash memory array 401 where that old CMT is being stored. For example, in FIG. 8 the old CMT 445 is stored in block 410. The parameter information relating to the cluster mapping table is the location within flash memory array 401 of cluster mapping table 446.

FDE block status 444 contains information as to which blocks are active blocks, which blocks are reserve blocks, and which blocks are defective or failed blocks. In addition, FDE block status table 444 contains cycle count information on each block of file structure 400. The block status table 444 reserves the cluster mapping block 422 and reserved blocks as inaccessible to allow subsequent clean-up. This prevents the computer system from attempting to overwrite these blocks. Failed blocks are also avoided and are indicated in block status table 444. FDE block status table 444 resides within block 422 next to FDE boot record 442.

Cluster mapping table 446 resides in block 422 next to FDE block status table 444. Cluster mapping table 446 maps logical cluster addresses sent by an operating system of the personal computer system to physical addresses within flash memory array 401. Cluster mapping table 446 allows flash memory array 401 and its associated file structure 400 to appear to the personal computer system as if it were a fixed disk drive or a floppy disk drive.

Figure 9:
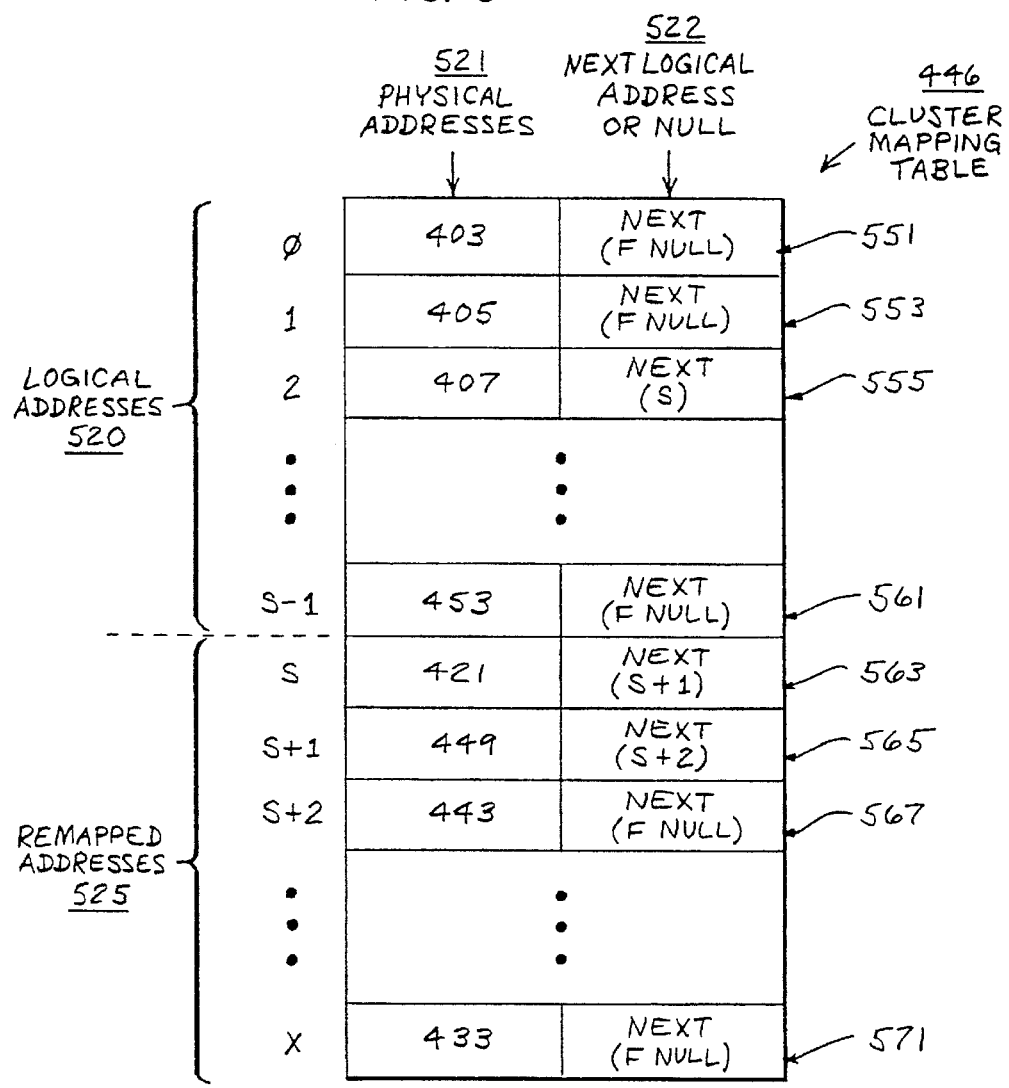
FIG. 9 shows an example of a cluster mapping table for a flash memory array.
Figure 10:
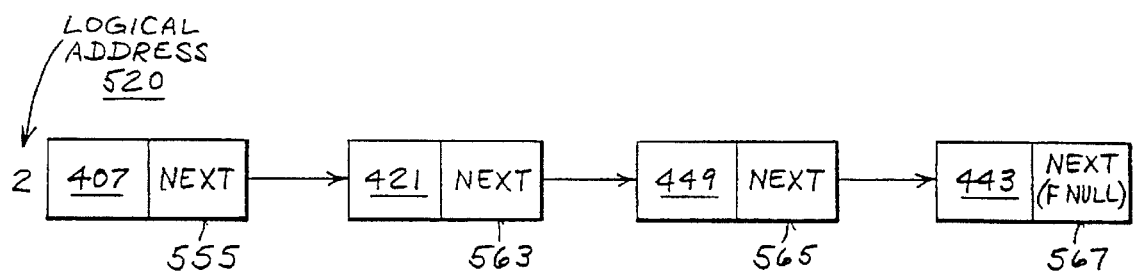
FIG. 10 shows an example of a linked list within the cluster mapping table of FIG. 9.
Figure 11:
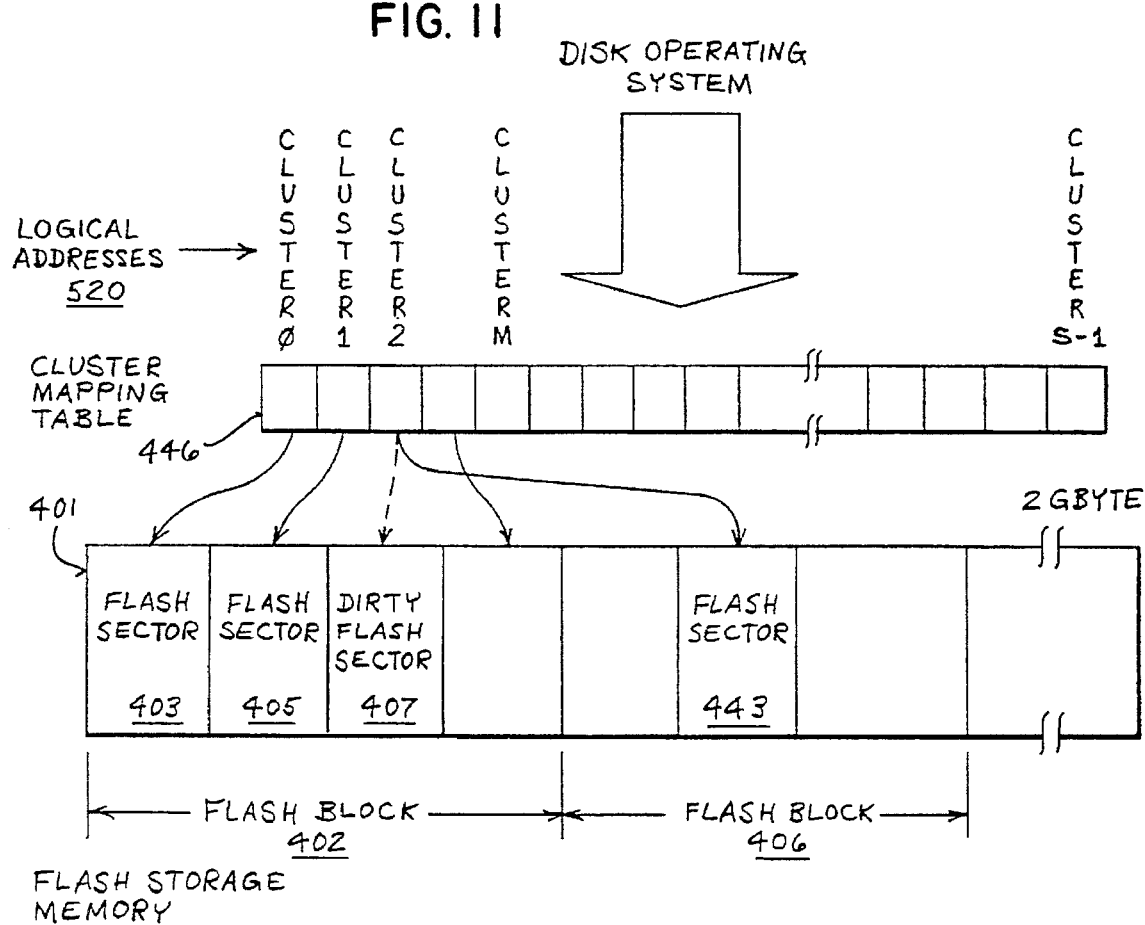
FIG. 11 shows an example of how the cluster mapping table operates.

FIGS. 9, 10, and 11 illustrate the organization and operation of cluster mapping table 446. Cluster mapping table 446 is a table that correlates logical cluster addresses 520 shown in FIG. 9 with the physical addresses listed in column 521. This correlation is also referred to as an associational mapping.

The logical cluster addresses found in list 520 are the logical addresses that would be sent by a disk operating system of a personal computer system to a fixed disk drive or a floppy disk drive storing code or data for the personal computer system.

For a prior art computer system, logical cluster addresses are addresses of clusters of a fixed disk drive or floppy disk drive. Each cluster is comprised of one or more sectors making up tracks of the conventional fixed disk or floppy disk. The number of sectors per cluster depends upon the size or configuration of the prior art fixed disk or floppy disk drive.

Flash memory array 401 is, of course, not a conventional fixed disk or a conventional floppy disk. Flash memory array 401 is comprised of flash memory that can only be erased in relatively large blocks. Moreover, each single bit cell of flash memory array 401 cannot be overwritten from a logical zero to a logical one without a prior erasure.

For the embodiment shown in FIG. 8, file structure 400 has one sector per cluster. For file structure 400, sectors containing sequential data may be scattered throughout different blocks. For example, the beginning lines of code may be in sector 409 of block 402 of flash memory array 401 of FIG. 8, and the ending lines of that same code may be in sector 445 of block 406. In a conventional fixed disk drive or floppy disk drive, bits of data can be overwritten without a prior erase cycle. In contrast, for flash memory 401 of FIG. 8, each single bit cell cannot be overwritten from a logical zero to a logical one without a prior erasure. Therefore, for flash memory array 401, new data does not overwrite old data without a prior erasure (except when writing a single bit from a logical one to a logical zero). Instead, an old sector is identified as a dirty sector. This indicates that the sector contains data that is no longer to be used. The dirty sector is then erased during a clean-up operation. In other words, a dirty sector contains data or code that is to be erased upon the next clean-up operation. For example, sector 407 of file structure 400 shown in FIG. 8 is a dirty sector containing old unwanted code or data.

Instead of new data or code being overwritten into dirty sector 407, new code or data is simply written into available space in a free block or a reserve block within flash memory array 401. For example, new data or code would be written into one of the available sectors of reserve block 416.

In spite of the differences between the characteristics of flash memory array 401 and a conventional fixed disk drive or floppy disk drive, cluster mapping table 446 makes flash memory array 401 of FIG. 8 appear to the operating system of the personal computer system as if flash memory 401 were a fixed disk drive or a floppy disk drive. Cluster mapping table 446 does this by mapping cluster logical addresses to physical sectors within flash memory array 401.

Cluster mapping table 446 is a table comprised of a plurality of linked-list entries. The fact that cluster mapping table 446 contains linked lists allows cluster mapping table to be added to over time.

Cluster mapping table 446 shown in FIG. 9 maps logical addresses found in list 520 to physical addresses found in column 521. Column 522 contain pointers for each of the table entries. A null pattern of all logical ones stored in a particular entry of column 522 indicates that the particular entry is the end of a linked-list. A null pattern of all logical ones is referred to as the F null (hexadecimal) pattern of data.

For the embodiment of cluster mapping table 446 shown in FIG. 9, there is only one sector per cluster. CMT 446 operates as follows. Entry 551 in cluster mapping table 446 maps cluster logical address zero to physical sector address 403 of flash memory array 401. For ease of discussion, the physical addresses listed in column 521 of FIG. 9 are the same as the reference numbers for the sectors of file structure 400 in FIG. 8. Thus, physical address 403 of entry 551 corresponds to sector 403 of file structure 400 of FIG. 8. For entry 551 of FIG. 9, the pointer within column 522 contains the F null pattern of data. This indicates that there are no further linked-list entries for logical address zero. This implies that sector 403 of file structure 400 is not a dirty sector. This means that the sector found at physical address 403 in fact corresponds to logical cluster address zero.

Similarly, cluster mapping table 446 entry 553 maps cluster logical address one to file structure physical address 405. Physical address 405 corresponds to sector 405 shown in FIG. 8. Entry 553 contains the F null pattern of data in the next logical address or null column 522. This indicates that there is no further linked-list entry, and therefore physical address 405 corresponds to cluster logical address one.

Entry 555 of cluster mapping table 446 is a first entry in a linked-list. Entry 555 maps sector logical address 2 to physical address 407. Sector 407 of flash memory array 401 is at physical address 407. Sector 407 of flash memory array 401 is a dirty sector. That means that sector 407 either (1) contains old information that is to be deleted upon the next clean-up involving block 402 or (2) is a bad sector that has a physical problem and is no longer to be used to store data. An example of a bad sector would be one that has one or more defective floating gate cells and thus cannot store data without an error.

The next logical address or null entry in column 522 for entry 555 points to address S. The address S is a remapped (i.e., appended) logical address pointed to by the pointer for entry 555.

In FIG. 9, the letter S also represents the number of logical sectors per partition of flash memory array 401. S also equals the number of logical sectors per partition of a hypothetical fixed disk or floppy disk that file structure 400 emulates.

Logical address S corresponds to entry 563 in cluster mapping table 446. For entry 563, physical address 421 is stored in column 521. Thus, physical address 421 of flash memory array 401 corresponds to remapped logical address S. Sector 421 of flash memory array 401 is found at physical address 421. Sector 421 is a dirty sector. The next logical address entry for entry 563 of cluster mapping table 446 contains the address S+1.

Entry 565 of cluster mapping table 446 maps the remapped logical address S+1 to physical address 449. Physical address 449 corresponds to sector 449 of flash memory array 401. Sector 449 of FIG. 8 is a dirty sector. The next logical address entry for entry 565 is the logical cluster address S+2.

Entry 567 of cluster mapping table 446 maps the logical appended cluster address S+2 to physical address 443. Physical address 443 in column 521 of cluster mapping table 446 corresponds to sector 443 shown in FIG. 8. Sector 443 is found in block 406 of file structure 400. Sector 443 is not a dirty sector. Instead, sector 443 is an active good sector. The next logical address or null entry for entry 567 of FIG. 9 is the F null (hexadecimal) entry. This indicates the end of the linked-list that begins with logical cluster address 2.

FIG. 10 illustrates the linked-list formed by entries 555, 563, 565 and 567 of cluster mapping table 446. Entry 555 maps logical cluster address 2 to physical sector address 407. The "next" pointer entry of 555 points to entry 563. The "next" pointer of entry 563 points to entry 565. The "next" pointer of entry 565 points to entry 567. The pointer for entry 567 contains the F null (hexadecimal) pattern of data. This null pattern of data indicates that entry 567 is the last entry in the linked-list chain.

As discussed with respect to FIG. 9, sectors 407, 421, and 449 are all dirty sectors. Sector 443 is an active "clean" or good sector. That is why the linked-list chain ends with sector 443. In other words, the linked-list chain ends with the first active good sector within the linked-list chain. The end result of the linked-list shown in FIG. 10 is that cluster mapping table 446 maps logical cluster address 2 to physical sector address 443, wherein physical sector 443 is an active "clean" sector.

A link is added to linked-list chains within cluster mapping table 446 each time a dirty sector is created or removed. In other words, each linked-list chain within cluster mapping table 446 represents a historical record of the creation and removal of dirty sectors.

For example, for the linked-list chain made up of entries 555, 563, 565, and 567, at one time sector 407 was an active clean sector containing valid data or code. At that prior point in time, logical address 2 was mapped by CMT 446 to physical address 407 and the pointer for entry 555 contained the F null pattern of data. But at some point during the operation of the personal computer system, sector 407 became a dirty sector. Once sector 407 became a dirty sector, the pointer for entry 555 was changed from the F null pattern of all ones to a new pattern that represents the appended logical address S in binary. This change from the F null pattern to the address S is done by overwriting (without prior erasure) because for a flash memory array 401, each single bit cell can be overwritten from a logical one to a logical zero. The F null pattern (comprised of all logical ones) was changed to address S by overwriting one or more of the bits from a logical one to a logical zero in order to create the address S.

Entry 563 was then stored in the cluster mapping table 446 as a remapped (i.e., appended) entry. Remapped address S was mapped in cluster mapping table 446 to physical address 421. Physical address 421 corresponds to sector 421. At a prior point in time, sector 421 was not a dirty sector. Instead, sector 421 was a good sector. At that prior point in time, the pointer for entry 563 contained the F null pattern of data. At that prior point in time, the cluster mapping table 446 thus mapped logical address 2 to sector 421.

Over time, sector 421 became a dirty sector. Therefore, another link needed to be added to the linked list for logical cluster address 2. Therefore, the pointer for entry 563 was changed from the null pattern of data to the remapped address S+1.

Entry 565 was then stored in cluster mapping table 446 in order to map appended address S+1 to physical address 449. Physical address 449 corresponds to sector 449. The pointer for entry 565 at that point in time contained the F null pattern of data. Sector 449 was at that point in time a good sector and not a dirty sector. Thus, at that point in time, cluster table 446 mapped logical address 2 to physical address 449.

Then, at a later point in time, sector 449 became a dirty sector. Once that occurred, the pointer for entry 565 was overwritten from the F null pattern to the address S+2. Entry 567 was then stored in cluster mapping table 446. Entry 567 contained the F null pattern of data in the "next logical address or null" position 522. That left sector mapping table 446 as it is shown in FIG. 9.

As discussed above, logical address S–1 is the last logical cluster address. The remapped (i.e., appended) addresses S through X shown in FIG. 9 are all addresses used to form linked lists. Entry 571 maps the last logical address X to physical address 443, and contains an F null pattern of data for its pointer.

Referring to FIG. 9, cluster mapping table 446 contains other entries. Cluster entry 561 maps logical cluster address S–1 to physical address 453. The pointer for entry 561 is the F null pattern of data. For entry 571, appended address X has a pointer with an F null pattern of data.

FIG. 11 illustrates how cluster mapping table 446 operates. The disk operating system sees the logical cluster addresses 520 stored within cluster mapping table 446. Cluster mapping table 446 maps those logical addresses 520 to the flash sectors within flash memory array 401. As noted above, for file structure 400 there is one sector per cluster.

As shown in FIG. 11, cluster mapping table 446 maps clusters 0 through S–1. The reason that cluster S–1 is the last cluster is that the clusters begin at logical address zero and that there are S clusters per partition.

Logical cluster 0 is mapped to flash memory sector 403. Logical cluster 1 mapped to sector 405 of flash memory array 401. Flash sectors 403 and 405 are within flash block 402 of flash memory array 401. Flash sectors 403 and 405 are both active good sectors.

As shown in FIG. 11, the logical cluster address 2 was originally mapped by cluster mapping table 446 to flash sector 407 of flash memory array 401. Flash sector 407 then became a dirty sector. Dirty flash sector 407 resides in flash block 402.

Links were then added to create a linked list within cluster mapping table 446 for cluster 2. The result of that linked list is that the logical cluster 2 is now mapped to flash sector 443 within flash block 406.

There can be several links in the linked list, but the end result is that cluster 2 is mapped to flash sector 443, even though cluster 2 was originally mapped to flash sector 407.

In one embodiment, up to two gigabytes of memory 401 can be addressed. In an alternative embodiment, the maximum addressable space can be larger or smaller than two gigabytes.

FIG. 9 is intended to show an example of cluster mapping table 446, and other variations are possible. In addition, cluster mapping table 446 only shows a portion of the logical cluster addresses, appended addresses, and entries. Numerous entries and logical addresses are found between addresses 2 and addresses S–1 and also between appended address S+2 and appended address X.

In one alternative embodiment of the present invention, file structure 400 has two (or more) sectors per cluster. A cluster is still the allocation unit. In one variation of that embodiment, the physical sectors for any particular logical cluster are written into flash memory array such that those physical sectors physically follow each other within flash memory array 401. In other words, the physical sectors per cluster are physically grouped together and are contiguous. The cluster mapping table for that alternative embodiment maps two (or more) contiguous physical sectors per logical cluster address.

In another embodiment, there are two (or more) sectors per cluster, but the physical sectors for any particular cluster can be scattered throughout the data or code areas of flash memory array 401. In other words, for that embodiment, the physical sectors per cluster do not have to be grouped together and thus do not have to be contiguous. The cluster mapping table for that alternative embodiment maps two (or more) physical sectors per logical cluster address.

In yet another alternative embodiment of the present invention, file structure 400 includes a sector mapping table that replaces cluster mapping table 446. That sector mapping table maps logical addresses of sectors to physical addresses of sectors. For that alternative embodiment, a logical sector is the allocation unit. The sector mapping table otherwise operates in a manner similar to that of CMT 446. For that alternative embodiment, the sector mapping table resides in a sector mapping block, which could be block 422, for example. For that alternative embodiment, CMT flag 440 and CMT space 448 are instead referred to as sector mapping table space, respectively.

In one embodiment of the present invention, a copy of cluster mapping table 446 is stored as a backup copy in a free or reserve sector within file structure 400 within FIG. 8. In one embodiment of the present invention, backup copies of cluster mapping table 446 are made periodically in time. In one embodiment of the present invention, backup copies of cluster mapping table 446 are made after each clean-up operation.

Figure 12:
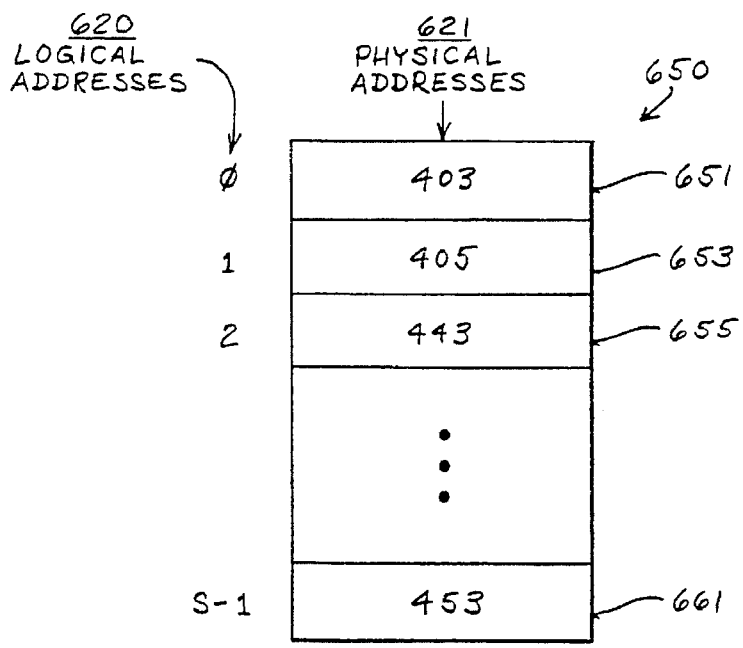
FIG. 12 shows an example of a back-up copy of a cluster mapping table.

In one embodiment, the backup copy of cluster mapping table 446 is a compressed version of cluster mapping table 446. In FIG. 12, table 650 represents a compressed version of cluster mapping table 446. Table 650 includes only the cluster logical addresses in column 520 and the physical addresses in column 521. The pointers for each entry and the appended (i.e., remapped) addresses are not included.

Table 650 includes the logical addresses 0 through S–1 (wherein S represents the number of sectors per partition) and not the appended addresses. Each address stored in column 621 is a physical address of an active good sector associated with a corresponding cluster logical address. For table 650, no linked-list chains are stored. The only things that are stored are the logical cluster address beginnings and physical address ends of link list chains and also entries without linked lists.

Entries 651 maps logical cluster address 0 to physical address 403. Entry 653 maps cluster logical address 1 to physical address 405. Entry 655 maps logical address 2 to physical address 443.

Comparing FIGS. 9 and FIGS. 12, it can be seen that the combination of entries 555, 563, 565, and 567 ultimately map cluster logical address 2 to physical address 443. Those four entries 555, 563, 565, and 567 comprise a linked-list chain. The compressed table 650 only stores the beginning and end of that linked-list chain. In other words, entry 655 merely stores the relationship between cluster logical address 2 and physical address 443.

Finally, entry 661 of table 650 maps logical address S–1 to physical address 453.

In one embodiment, cluster mapping table 446 or a compressed version of cluster mapping table 446 is stored in RAM of the personal computer system.

To the computer system, file structure 400 of FIG. 8 looks as if it were a hard disk drive or a floppy disk drive. File structure 400 can be loaded with a boot record, a file allocation table, root directory entries, and a data area with the same logical addresses as such areas would have were they stored on a disk drive. In other words, flash memory array 401 shown in FIG. 8 can be used with, for example, a conventional MS-DOS operating system, such as the one discussed with respect to FIG. 1.

In one embodiment, the flash disk emulation file structure 400 supports all existing versions of (1) DOS, (2) OS/2 (i.e., Operating System/2 of International Business Machines of Armonk, N.Y.) and (3) UNIX operating systems. Flash disk emulation file structure 400 does not depend upon a specific version of DOS, OS/2, UNIX, BIOS, or other disk resident data structure. Low level disk utilities for DOS and OS/2 are also supported by file structure 400.

In one embodiment, direct disk access for read and write operations defined by the interrupts 25H and 26H and the standard DOS device driver interface are supported by file structure 400.

In one embodiment, all functions defined by the BIOS interrupt 13H are supported by flash disk emulation driver structure 400.

Figure 1:
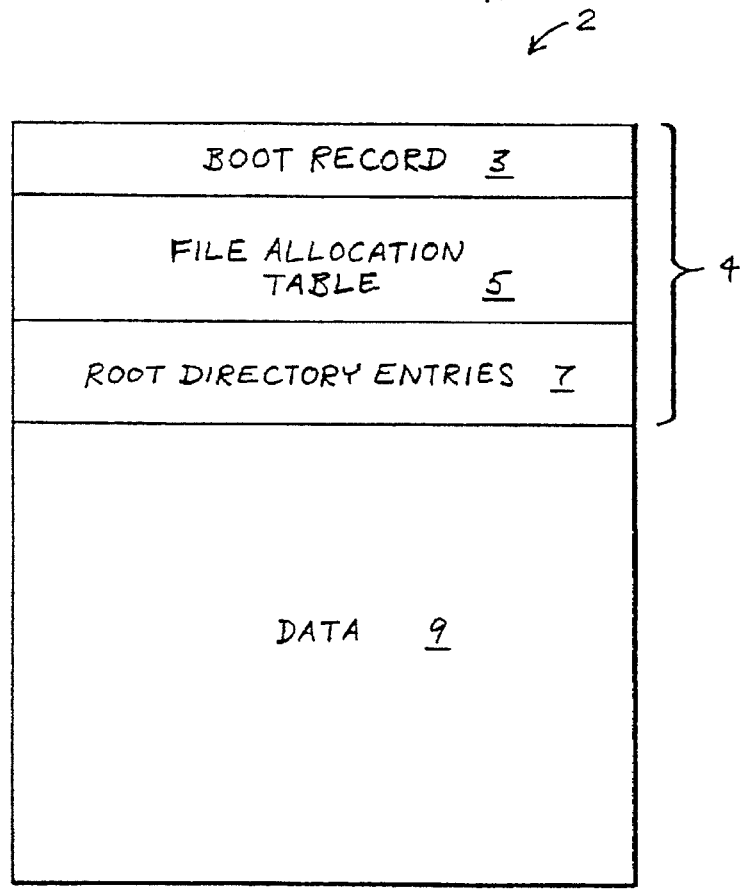
FIG. 1 shows the logical organization of a prior art operating system.

In one embodiment, flash memory array 401 is used in conjunction with an MS-DOS operating system. Referring both to FIG. 1 and FIG. 8, file structure 400 is divided into two logical area: a system area 4 and a data area 9. The system area contains a boot record 3, a file allocation table 5, and a root directory area 7 that contains root directory entries. The data area 9 contains files that are used to store application programs, data, and subdirectory information. The boot record 3, the file allocation table 5, and the root directory entry 7 occupy the beginning logical clusters of file structure 400, beginning with logical cluster 0.

Again, the organization shown with respect to FIG. 1 is a logical address organization. The actual physical sectors of flash memory array 401 that store boot record 3, file allocation table 5, root directory entry 7, and data 9 are determined by cluster mapping table 446.

Boot record 3 includes a boot strap loader program for loading the operating system. The boot record 3 also includes information as to the ASCII name of the formatting DOS, the number of bytes per sector, the number of sectors per cluster, the number of sectors in the boot record, the number of copies of the file allocation table, the number of root directory entries, the number of sectors per partition, the memory (i.e., emulated disk) type number, the number of sectors per file allocation table, the number of reserved or hidden sectors, and identification number for flash memory array 401, and extended boot sector signature, a volume identification, and a volume table.

The root directory 7 is a table of 32-byte entries that each set forth certain attributes of the file. Each directory entry making up the root directory 7 includes a file name, file extension, attribute flags, time and date stamps for the file, the starting cluster number for the clusters that make up the file, and the file size.

Each file on the disk is made up of one or more clusters. The file allocation table 5 contains a record of a form of a chain of how the clusters making up the file are linked together. In one embodiment, the FAT 5 contains a list of two-byte entries, one for each cluster. In alternative embodiments, the FAT entries are longer or shorter than two bytes. The directory entry for a file contains the starting cluster number for the file, and the operating system uses that starting cluster number to access the file allocation table. Each FAT entry is a pointer to the next cluster of the file. Thus, the FAT entry retrieved by that first access contains the cluster number of the next cluster making up the file. The operating systems uses that next cluster number to access the FAT to retrieve yet another cluster number and continues this process until a special marker in the FAT 5 is reached.

With MS-DOS, the logical structure for the files of file structure 400 is tree-like. Entries in the root directory can be pointers to subdirectories. The subdirectories can be nested.

The files storing code and data are scattered in physical sectors throughout flash memory array 401 of FIG. 8. Again, the cluster mapping table 446 is used to map the logical addresses for those files to the physical addresses of the sectors storing those files.

In an alternative embodiment of the invention, file structure 400 shown in FIG. 8 additionally includes a header. The header resides, for example, in block 414, which no longer then is a free block.

The header is a file that contains information about flash memory array 401. In one embodiment, the header contains information as to the unformatted size of the entire flash memory array 401, the formatted size of flash memory array 401, the total number of blocks within flash memory array 401, and detailed device information relating to flash memory array 401. In one embodiment of the present invention, the detailed device information stored in the header includes erase and write voltages; erase and write commands; and erase and write algorithms; individual and full chip maximum cycling specifications; and read, write, and erase performance characteristics of flash memory array 401.

In an alternative embodiment, the header additionally includes information as to the location of an alternate header or alternate headers.

With this alternative embodiment wherein the header is stored in one of the blocks of flash memory array 401, for example block 414, the header must be periodically refreshed. Refreshing of the header entails completely erasing and rewriting the header periodically. This periodic refreshing of the header is necessary because the header typically is a cold block with respect to the other blocks of flash memory array 401. In other words, the header resides in a block that is cycled less frequently than the other blocks of flash memory array 401. Therefore, the header must be refreshed periodically.

In order to determine when the header needs to refreshed, the number of erase/program cycles of the blocks adjacent to the header and of the header are kept track of. A cycle count parameter is stored in the main header block. The cycle count represents the number of the erase/write cycles of the header and of the blocks adjacent to the header.

In this alternative embodiment, an alternative (i.e., backup) copy of the header is stored in another block of flash memory 401, for example, stored in block 420. This alternative header stored in block 420 is temporarily used as the header while the refresh operation is occurring.

In yet another alternative embodiment, the header does not reside within flash memory 401. Instead, the header resides within a memory array on a separate integrated circuit card that is part of a personal computer system. The memory array storing the header would be a register number accessed memory array. The header would thus be stored in a separate shadow array.

With this shadow array embodiment, the header would not need to be refreshed given that the header would not reside within flash memory array 401. It follows that the header would not be a cold block and that the header would not need to include a cycle count parameter relating to hot/cold cycling.

It is to be appreciated that use of a header is optional. One embodiment of the present invention avoids the use of a header with the following structure. Flash memory 401 has manufacturer and device identification codes stored within the memory array. In one embodiment, those manufacturer and device identification codes trigger the software of the personal computer system to go to a look up table that stores header type information that can be inferred from those particular manufacturer and device identification codes.

FIG. 13 illustrates an alternative cluster mapping arrangement for file structure 400. For the alternative arrangement shown in FIG. 13, sector mapping table 746 is used in place of cluster mapping table 446. Cluster sector mapping table 746 is also referred to as flash sector hash table 746.

For the alternative embodiment shown in FIG. 13, there is one sector per cluster for file structure 400. In addition, there are four sectors in a chain. Each chain has four sectors that have logical addresses that are sequential.

The logical sectors addresses of sector mapping table 746 are found in column 720 of FIG. 13.

For example, entry 751 of sector hash table 746 contains chain 0. Chain 0 is accessed when any of the four logical sections 0, 1, 2, or 3 are retrieved. In other words, chain 0 is comprised of sectors with logical addresses 0, 1, 2, and 3.

Chain 1 is comprised of sectors with logical addresses 4, 5, 6, and 7. Chain 1 is found at entry 753 of sector mapping table 746.

Entry 761 in table 746 contains the F null (hexadecimal) pattern of data comprised of a pattern of data of all logical ones. This indicates that the chain associated with entry 761 is currently not being used.

As shown in FIG. 13, sector logical addresses go to address S–1. S equals the number of sectors per partition. The last entry in sector hash table 746 is chain M. Entry 765 is the last entry in sector hash table 746, and entry 765 corresponds to chain M. Entry 765 is associated with sector logical addresses S–4 through S–1. The last sector logical address per partition is S–1 because the sector logical addresses begin with address zero.

Each chain stored in sector mapping table 746 is made up of a linked list of entries for the sectors associated with that chain. Each entry making up a chain stored in sector mapping table 746 is also referred to as a sector hash entry.

FIG. 13 illustrates examples of certain entries making up the linked list for chain 0 of sector hash table 746. The entries shown in FIG. 13 are entry 731 and entry 741.

Entry 731 shown in FIG. 13 illustrates what makes up an entry within a chain stored in sector mapping table 746. Entry 731 is made up of a disk sector entry 733, a flash sector entry 735, and a pointer entry 737.

Disk sector entry 733 stores the logical address of one of the sectors comprising the chain. If entry 731 is the first entry in the linked list chain 0, then the sector logical address stored in 733 would be the sector logical address 0, which would be the logical address for sector 0. The logical address of the disk sector stored in entry 733 is the address as seen by the disk operating system for the personal computer system.

The address stored in entry 735 of FIG. 13 is the physical address within flash memory array 401 (of FIG. 8) of a sector associated with the logical sector that has an address stored in entry 733. In other words, a sector having its physical address stored in entry 735 is a physical sector within flash memory array 401 of FIG. 8. Entry 731 thus maps or correlates a logical address of a sector to a physical address of a sector.

If physical sector address 731 is for an active good sector and not for a dirty sector, then entry 737 of entry 731 stores the F null (hexadecimal) pattern of data. If, however, physical sector address 731 is for a dirty sector, then entry 737 of entry 731 stores a pointer that is the address of a next sector hash entry.

As shown in FIG. 13, pointer 737 points to entry 741 of chain 0 of sector mapping table 746.

As shown in FIG. 13, entry 741 stores a sector logical address of 2 in location 733 of entry 741. Entry 741 also stores sector physical address 405 in location 735 of entry 741. Address 405 is the physical address of sector 405 of flash memory array 401 shown in FIG. 8. Thus, entry 741 maps sector logical address 2 to physical address 405 of physical sector 405 of flash memory array 401.

Entry 741 of the linked list for chain zero has the F null pattern of data stored at location 737. This indicates that physical sector 405 is an active good sector.

As discussed above, for the embodiment shown in FIG. 13, there are four logical sectors per chain. Thus, at a minimum, each chain would have four entries, one for each sector making up the chain.

Sector hash table 746 is constructed on the fly as additional sectors of flash memory array 401 are used to store code or data. New chains and new sector hash entries are added as additional sectors of flash memory array 401 are used to store code or data. The sector hash table 746 is continually built up until all the sectors available for storing code or data have been allocated.

If a sector hash entry has a physical sector address at location 735 and a F null pattern of data at location 737, and if that physical sector identified by that physical sector address becomes dirty, then the F null pattern of data at location 737 is overwritten to become a pointer to an address of a next sector hash entry. That next sector hash entry would be a newly added sector hash entry and would contain the physical address of an active good sector.

For example, if physical sector 405 became a dirty sector, then a new sector hash entry would be added to chain 0. The F null pattern of data at location 737 of entry 741 would be overwritten to point to the new sector hash entry. The new sector hash entry would contain, for example, sector physical address 409 in location 735 and sector logical address 2 in location 733 if logical sector 2 was to be mapped to active good physical sector 409. The overwriting of the F null pattern of data can be done without a prior erasure because each bit of flash memory 401 can be overwritten from a logical one to a logical zero without a prior erasure.

The computer system repeatedly traverses the chains of flash sector hash table 746 until it finds for each allocated logical sector a sector hash entry that contains the F null pattern of data at location 737. Each valid sector hash entry containing the F null pattern of data at location 737 maps a logical sector address (stored in location 733) to an active "clean" physical sector address (stored in location 735). If, on the other hand, the F null pattern is not stored at location 737, then the physical address stored at location 735 is an address of a dirty sector.

In one alternative embodiment, there would be 2 (or more) sectors per cluster. In one alternative embodiment, there would be 4 sectors per cluster. For those alternative embodiments, flash sector hash table 846 would map the logical sector addresses to the sector physical addresses.

In yet another alternative embodiment, a flash sector hash table would map logical cluster addresses to sector physical addresses.

To avoid having to repeatedly traverse long hash chains for frequently changed sectors, a compressed sector hash table is stored in RAM of the personal computer system. RAM sector hash table 846 shown in FIG. 13 is an example of a compressed sector hash table. To form RAM sector hash table 846, all sector hash entries in sector mapping table 746 that do not contain the F null pattern at location 737 are not written into RAM. Only the sector hash entries containing the F null pattern of data at location 737 are written into RAM. Thus, only the sector hash table entries of sector mapping table 746 that map logical sector addresses to active good sectors are written into RAM.

RAM sector hash table 846 is built on the fly as sectors are read or written.

RAM sector hash table 846 is used for a performance improvement. If the copy of RAM sector hash table 846 is lost from RAM, that event has no impact on the consistency of the data stored in flash memory array 401. This is because sector hash table 746 would still be stored in flash memory array 401.

Nevertheless, to help ensure the integrity of file system 400, in one embodiment of the invention a back-up copy of sector hash table 746 is stored in a free sector or sectors within a free block or a reserve block flash memory array 401.

In an alternative embodiment a sector mapping table that directly maps logical sector addresses to active good sectors would be stored in RAM (and in a free sector of flash memory army 401 as a back-up).

FIG. 13 also shows flash sector allocation bitmap 881. Each bit in bitmap 881 is associated with a physical sector of flash memory array 401. For example, bit 0 is associated with physical sector 403, bit 1 is associated with sector 405, etc. A bit that is a logical one indicates a free sector. A bit that is a logical zero indicates a dirty sector. Thus free sectors and dirty sectors of flash memory array can be quickly determined by an inspection of bitmap 881. Moreover, any pattern of contiguous free or dirty sectors can be easily determined from an inspection of bitmap 881.

In one embodiment of the present invention, flash sector allocation bitmap 881 is cached in the RAM of the personal computer system in order to help to improve performance of the personal computer system.

FIG. 13 also illustrates block status table 444 of flash memory array 401. As discussed above, the cycle count of individual blocks is kept in block status table 444. Block status table 444 is updated at the end of each clean-up operation. RAM block status table 844 is a temporary RAM copy of block status table 444. RAM block status table 844 is used during the reallocation operation during clean-up of flash memory array 401.

In one embodiment of the present invention, the personal computer system also includes hardware and firmware for performing logical state inversion in conjunction with flash disk emulation file structure 400. Logical state inversion operates as follows.

Standard prior art disk format operations for prior art fixed disks and diskettes are defined to clear all blocks of the prior art fixed disks and diskettes to a logical zero state. Also, physical sectors of prior art fixed disks and floppy disks are typically marked upon format to be (1) "free and good" (i.e., non-defective), (2) "bad," (3) "reserved/unused," or (4) "remapped," with the standard, default condition being free/good. Prior art format procedures typically specify a "00" code for marking fixed disk and diskette sectors (or larger "cluster" allocation units) as being free/good.

In contrast, the cells of flash memory array 401 are pre-erased to the logical one state. Therefore, in one embodiment of the present invention, hardware is added to the personal computer system to invert the output from flash memory array 401. By inverting the flash device output with the FDE system hardware, the erased state of the flash memory array 401 will appear to the system as logical "0." This makes the data of erased flash blocks logically consistent with the prior art initially-formatted and free/good descriptors. How the erased space is treated is important because the FDE file system requires that free erased space be available for maximum write performance.

In one embodiment of the present invention, the flash disk emulation control firmware performs re-write minimization. This is explained as follows.

Prior art operating systems, such as DOS, typically use "00" data as the default, active code. In DOS, for example, an unused directory filename entry is marked with "00," then is flagged with "E5H" data when the entry has been logically deleted.

The above logical state inversion for flash memory array 401 would in most cases allow this first filename byte to be successively overwritten from "00" to the valid data of the valid filename's first byte, then to "E5H." The logical inversion causes the physical data in the flash memory array 401 to invert from the one state to the zero state, which can be done without re-writing the entire block to another pre-erased block.

In one embodiment, an algorithm is added to the FDE system's central firmware, and that algorithm is used in conjunction with the above-described logical inversion hardware. That algorithm minimizes the number of re-writing operations that are necessary. That algorithm first checks sector or cluster re-write operations with respect to what logical data state transitions are required. When small sections of data are to be re-written (e.g., FAT entry modifications), that re-writing may be accomplished by "1" to "0" transitions in the physical flash memory, which in turn may be accomplished by overwriting a few bytes within an active, valid data storage sector or cluster. This would avoid unnecessary re-writing of the entire cluster.

In one embodiment of the invention, file structure 400 would also include error detection and logical sector verification.

The minimal FDE implementation would allocate data storage units (sectors or clusters) in regular $2^N$ partitions (e.g., 512-byte DOS sectors) such that a given (even) number of storage units coincides exactly with the large erase block boundaries of flash memory array 401. Many system environments, however, require the calculation and storage upon write, and the passing back upon read, of two or more cycle redundancy check ("CRC") or error correction code ("ECC") data fields, which can be used to detect (and possibly correct) media or transmission failures.

In one embodiment of the invention CRC or ECC data fields would be added to sectors or clusters of file structure 400. The extra CRC/ECC bytes make the minimum data allocation unit $2^N+M$ in size, where M equals the extra CRC or ECC bytes. This often yields odd number, or at least not a $2^N$ multiple, of data allocation units per erase block. This increases the complexity of the FDE system firmware but helps to improve overall flash memory sub-system reliability by providing the capability of detecting or possibly even correcting media errors.

By expanding the number of extra "overhead" bytes per storage unit to M+L, error detection for cluster table mapping 446 is provided. The number of extra bytes, L, needs to be sufficient to index the total number of formattable logical sectors allowed by the given FDE system. The data contained in L is the logical sector number that is assigned to that particular physical flash allocation unit. Thus, when the cluster mapping table 446 points to a particular physical location, the logical sector assignment can be verified when that physical location is actually accessed. This provides immediate detection of errors that may arise in the RAM-image cluster mapping table arising from soft errors in the RAM memory device. Because flash memory array 401 does not incur soft errors, these errors can be recovered by reading the flash-based linked-list version of the cluster mapping table 446. The data in the extra logical sector table bytes, L, would have to be overwritten or otherwise invalidated in some way when the logical sector/cluster is subsequently re-mapped into a different physical sector/cluster.

The intrinsic flash cycling management that is used with file structure 400 helps to improve the reliability of flash memory array 401. The fact that file structure 400 includes provisions for backup copies also helps to improve reliability.

Embodiments of the present invention help to minimize system RAM requirements by (1) embedding control code in firmware and (2) using reserve blocks for direct block-to-block file and directory transfer during clean-up.

The block status table 444 supports uniform flash device and block cycling, which helps to improve memory reliability while minimizing hot spots that might cause erase and write performance degradation relative to other devices and blocks within devices (when they exist). Block status table 444 also tracks reserve blocks, which helps to improve the reliability and speed of clean-up and "background-task" erasure.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A non-volatile semiconductor memory system that emulates a disk storage device comprising at least one allocation unit, each allocation unit comprising at least one sector, said non-volatile semiconductor memory system comprising non-volatile semiconductor memory comprising a plurality of blocks, wherein said memory is erased in blocks, each of said blocks comprising a plurality of sectors, said system comprising:

(A) an active block for storing first data;

(B) a reserve block for storing second data, wherein the second data is a copy of the first data, wherein the copy is made during a clean-up operation prior to an erasure of the active block;

(C) a mapping table for mapping a logical address of an allocation unit of a disk storage device to a physical address of a sector within the non-volatile semiconductor memory, said mapping table comprising;

(1) at least one logical address field corresponding to a logical address of an allocation unit on a disk storage device emulated, (2) a first corresponding physical address field of a sector within the non-volatile semiconductor memory, (3) a next logical address field comprising a first value if the first corresponding physical address is clean such that valid data is located in the non-volatile semiconductor memory at that first physical address, said next logical address comprising a logical address value pointing to a second logical address and corresponding second physical address in the mapping table if said first physical address is dirty such that invalid data is located at the first physical address, and said mapping table being updated during a clean-up operation to change the first value of the next logical address field to point to the second logical address and to update the corresponding physical address to identify the second physical address, the second physical address being an address of the data copied into the reserve block in the non-volatile semiconductor memory.

2. The non-volatile semiconductor memory of claim 1, wherein the computer memory is a flash electrically erasable programmable read-only memory.

3. The non-volatile semiconductor memory of claim 1, further comprising:

(D) a block status table for providing information as to whether a block of the non-volatile semiconductor memory is:

(1) an active or a reserve block, (2) free or in use, and (3) defective or not defective.

4. The non-volatile semiconductor memory of claim 3, wherein at least one block comprises:

(E) a header containing information comprising:
  (1) an unformatted size of the non-volatile semiconductor memory;
  (2) a maximum number of erase cycles recommended for the non-volatile semiconductor memory;
  (3) identification of values of erase and write voltages;
  (4) identification of erase and write commands that are issued to respectively execute erase and write algorithms;
  (5) erase and write algorithms.

5. The non-volatile semiconductor memory of claim 1, wherein the allocation unit is a sector.

6. The non-volatile semiconductor memory of claim 1, wherein the allocation unit is a cluster comprising a plurality of sectors.

7. The non-volatile semiconductor memory of claim 1, further comprising an inverter for logically inverting each bit of data read from the non-volatile semiconductor memory.

8. The non-volatile semiconductor memory of claim 1, further comprising a block containing an error correction code data field.

9. The non-volatile semiconductor memory of claim 1, further comprising a block containing a sector allocation bitmap.

10. A computer system comprising:
  (A) a central processing unit;
  (B) a non-volatile semiconductor memory system that emulates a disk storage device comprising at least one allocation unit, each allocation unit comprising at least one sector, said non-volatile semiconductor memory system comprising non-volatile semiconductor memory comprising a plurality of blocks, wherein said memory is erasable in blocks, each of said blocks comprising a plurality of sectors, wherein the non-volatile semiconductor memory is accessed by the central processing unit, and wherein the non-volatile memory comprises:
    (1) an active block for storing first data;
    (2) a reserve block for storing second data, wherein the second data is a copy of the first data, wherein the copy is made during a clean-up operation prior to an erasure of the active block;
    (3) a mapping table for mapping a logical address of an allocation unit of a disk storage device to a physical address of a sector within the non-volatile semiconductor memory, said mapping table comprising;
      (a) at least one logical address field corresponding to a logical address of an allocation unit on a disk storage device emulated,
      (b) a first corresponding physical address field of a sector within the non-volatile semiconductor memory,
      (c) a next logical address field comprising a first value if the first corresponding physical address is clean such that valid data is located in the non-volatile semiconductor memory at that first physical address, said next logical address comprising a logical address value pointing to a second logical address and corresponding second physical address in the mapping table if said first physical address is dirty such that invalid data is located at the first physical address, and
      said mapping table being updated during a clean-up operation to change the first value of the next logical address field to point to the second logical address and to update the corresponding physical address to identify the second physical address, the second physical address being an address of the data copied into the reserve block in the non-volatile semiconductor memory such that a disk storage device is emulated and the mapping table performs translations to perform the emulation; and
  (C) storage means for storing code for controlling the non-volatile memory.

11. The computer system of claim 10, wherein the storage means is a read-only memory.

12. The computer system of claim 10 wherein the storage means is a random-access memory.

13. The computer system of claim 12, wherein the random-access memory is a general-purpose system random-access memory.

14. The computer system of claim 12, wherein the random-access memory is a buffer memory.

15. The computer system of claim 10, wherein the non-volatile semiconductor memory is paged-memory mapped.

16. The computer system of claim 10, wherein the non-volatile semiconductor memory is direct memory mapped.

17. The computer system of claim 10, further comprising a hardware controller for executing the code for controlling the non-volatile semiconductor memory.

18. The non-volatile semiconductor memory of claim 1, wherein previous data at a determined logical address is modified by writing modified data to a free address in the non-volatile semiconductor memory, adding a new entry into the mapping table comprising a logical address field and corresponding physical address field and next logical address field to identify the physical address the modified data was written to and to set the next logical address field to the first value, and changing the corresponding next logical address field of the previous data from the first value to a value which points to the logical address of the new entry.

19. The computer system of claim 10, wherein previous data at a determined logical address is modified by writing modified data to a free address in the non-volatile semiconductor memory, adding a new entry into the mapping table comprising a logical address field and corresponding physical address field and next logical address field to identify the physical address the modified data was written to and to set the next logical address field to the first value, and changing the corresponding next logical address field of the previous data from the first value to a value which points to the logical address of the new entry.

20. In a non-volatile semiconductor memory comprising a plurality of blocks, a method for emulating a disk storage device comprising at least one allocation unit, each allocation unit comprising at least one sector, said method comprising the steps of:
  (A) providing a mapping table comprising at least one entry that maps a logical address for accessing the disk storage device to a physical address of the semiconductor memory, each entry including a logical address field corresponding to a logical address of an allocation unit on a disk storage device emulated, a first corresponding physical address field of a sector within the non-volatile semiconductor memory, and a next logical address field comprising a first value if the first corresponding physical address is clean such that valid data is located in the non-volatile semiconductor memory at that first physical address, said next logical address comprising a logical address value pointing to another logical address and another corresponding physical address in the mapping table if said first physical address is dirty such that invalid data is located at the first physical address;

(B) generating a linked list of entries for each logical address corresponding to a given logical address of an allocation unit on a disk storage device emulated, said linked list added to each time data is moved in the non-volatile semiconductor memory, said next logical address field pointing to a next logical address entry in the table, the next logical address field of a last entry containing a first value to indicate the end of the linked list and that valid data is located in the memory at the corresponding physical address;

(C) updating data by writing new data to a free memory location, adding a new entry at an available logical address to the linked list to identify the physical address at which the new data is located, said corresponding next logical address field being set to the first value to identify a new last entry in the linked list and the location of the valid data, and updating the next logical address field of a prior last entry in the linked list from the first value to a value which points to the logical address in the table at which the new entry is located.

21. The method as set forth in claim 20 wherein the memory is erased in blocks, said method further comprising the steps of:

(D) providing an active block for storing first data;

(E) providing a reserve block for storing second data;

(F) performing an erasure of a block comprising the steps of:
  (1) performing a clean-up operation of the block to be erased by copying said first data to the reserve block as the second data;
  (2) updating the mapping table to change the first value of the next logical address field to point to an available next logical address and updating the corresponding physical address to the next logical address to identify the physical address of the data copied into the reserve block in the non-volatile semiconductor memory; and
  (3) erasing said block.

22. A non-volatile semiconductor memory system that emulates a disk storage device comprising at least one allocation unit, each allocation unit comprising at least one sector, said non-volatile semiconductor memory system comprising non-volatile semiconductor memory comprising a plurality of blocks, each of said blocks comprising a plurality of sectors, said system comprising:

(A) a mapping table for mapping logical addresses of an allocation unit of a disk storage device to physical addresses of a sector within the non-volatile semiconductor memory, said mapping table comprising:
  (1) at least one logical address field corresponding to a logical address of an allocation unit on a disk storage device emulated; and
  (2) a first corresponding physical address field of a sector within the non-volatile semiconductor memory;

(B) a read/write controller for performing read and write operations to the non-volatile semiconductor memory, said controller performing a read operation by referencing the mapping table for translating the logical address to be accessed to the corresponding physical address in the non-volatile semiconductor memory, said controller performing a write operation by writing the data to a free memory location identified by a different physical address, said controller updating the mapping table to identify the different physical address;

wherein memory write operations are performed in a timely manner without performing a prior erasure operation to emulate a disk storage device.

23. The non-volatile semiconductor memory as set forth in claim 1, wherein the first value is a null value.

24. The computer system as set forth in claim 10, wherein the first value is a null value.

25. The method as set forth in claim 20, wherein the first value is a null value.

26. The non-volatile semiconductor memory system as set forth in claim 22, wherein the first value is a null value.

* * * * *

UNITED STATES PATENT AND TRADEMARK OFFICE
CERTIFICATE OF CORRECTION

PATENT NO.    : 5,630,093
DATED         : May 13, 1997
INVENTOR(S)   : Holzhammer et al.

It is certified that error appears in the above-identified patent and that said Letters Patent is hereby corrected as shown below:

In column 3 at line 35 delete "pads" and insert --parts--

In column 7 at line 15 delete "army" and insert --array--

In column 25 at line 65 delete "army" and insert --array--

Signed and Sealed this

Fourth Day of November, 1997

Attest:

BRUCE LEHMAN

Attesting Officer

Commissioner of Patents and Trademarks